US010001676B2

(12) United States Patent
Senokuchi et al.

(10) Patent No.: US 10,001,676 B2
(45) Date of Patent: Jun. 19, 2018

(54) DISPLAY DEVICE

(71) Applicant: Sharp Kabushiki Kaisha, Sakai-shi, Osaka (JP)

(72) Inventors: Yuta Senokuchi, Sakai (JP); Shohichi Andoh, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 11 days.

(21) Appl. No.: 15/111,535

(22) PCT Filed: Feb. 19, 2015

(86) PCT No.: PCT/JP2015/054557
§ 371 (c)(1),
(2) Date: Jul. 14, 2016

(87) PCT Pub. No.: WO2015/129537
PCT Pub. Date: Sep. 3, 2015

(65) Prior Publication Data
US 2016/0334656 A1    Nov. 17, 2016

(30) Foreign Application Priority Data
Feb. 26, 2014    (JP) ................. 2014-035229

(51) Int. Cl.
*G02F 1/1339*    (2006.01)
*G02F 1/1333*    (2006.01)
(Continued)

(52) U.S. Cl.
CPC ........ *G02F 1/1339* (2013.01); *G02F 1/13439* (2013.01); *G02F 1/133345* (2013.01);
(Continued)

(58) Field of Classification Search
CPC .................................................... G02F 1/1339
See application file for complete search history.

(56) References Cited

U.S. PATENT DOCUMENTS 8,363,199 B2    1/2013  Sekiya et al.
9,013,668 B2    4/2015  Nakahara et al.
(Continued)

FOREIGN PATENT DOCUMENTS

| JP | 2000-267073 A | 9/2000 |
| JP | 2010-091896 A | 4/2010 |
| WO | 2012/063719 A1 | 5/2012 |

OTHER PUBLICATIONS

Official Communication issued in International Patent Application No. PCT/JP2015/054557, dated Apr. 7, 2015.

*Primary Examiner* — Edmond Lau
(74) *Attorney, Agent, or Firm* — Keating & Bennett, LLP

(57) ABSTRACT

A liquid crystal panel includes an array substrate, a CF substrate, a sealing member, a first transparent electrode film, a first interlayer insulating film, and a second transparent electrode film. The sealing member is disposed between the array substrate and the CF substrate to seal internal space between the substrates. The first electrode film is disposed in a display area on the array substrate. The sealing member is bonded to the first interlayer insulating film. The first insulating film is disposed on the first electrode film closer to the array substrate in an area across a boundary between the display area and a non-display area. The first insulating film includes a slit arranged closer to the display area than to the sealing member in the non-display area. The second transparent electrode film is disposed on the first insulating film closer to the array substrate at least in the display area.

8 Claims, 28 Drawing Sheets

(51) Int. Cl.
*G02F 1/1335* (2006.01)
*G02F 1/1343* (2006.01)

(52) U.S. Cl.
CPC .............. *G02F 1/133512* (2013.01); *G02F 2001/134381* (2013.01); *G02F 2201/50* (2013.01)

(56) References Cited

U.S. PATENT DOCUMENTS

2008/0137022 A1\* 6/2008 Komeno ............... G02F 1/1337
    349/153
2010/0079718 A1    4/2010 Sekiya et al.
2013/0222725 A1    8/2013 Nakahara et al.

\* cited by examiner

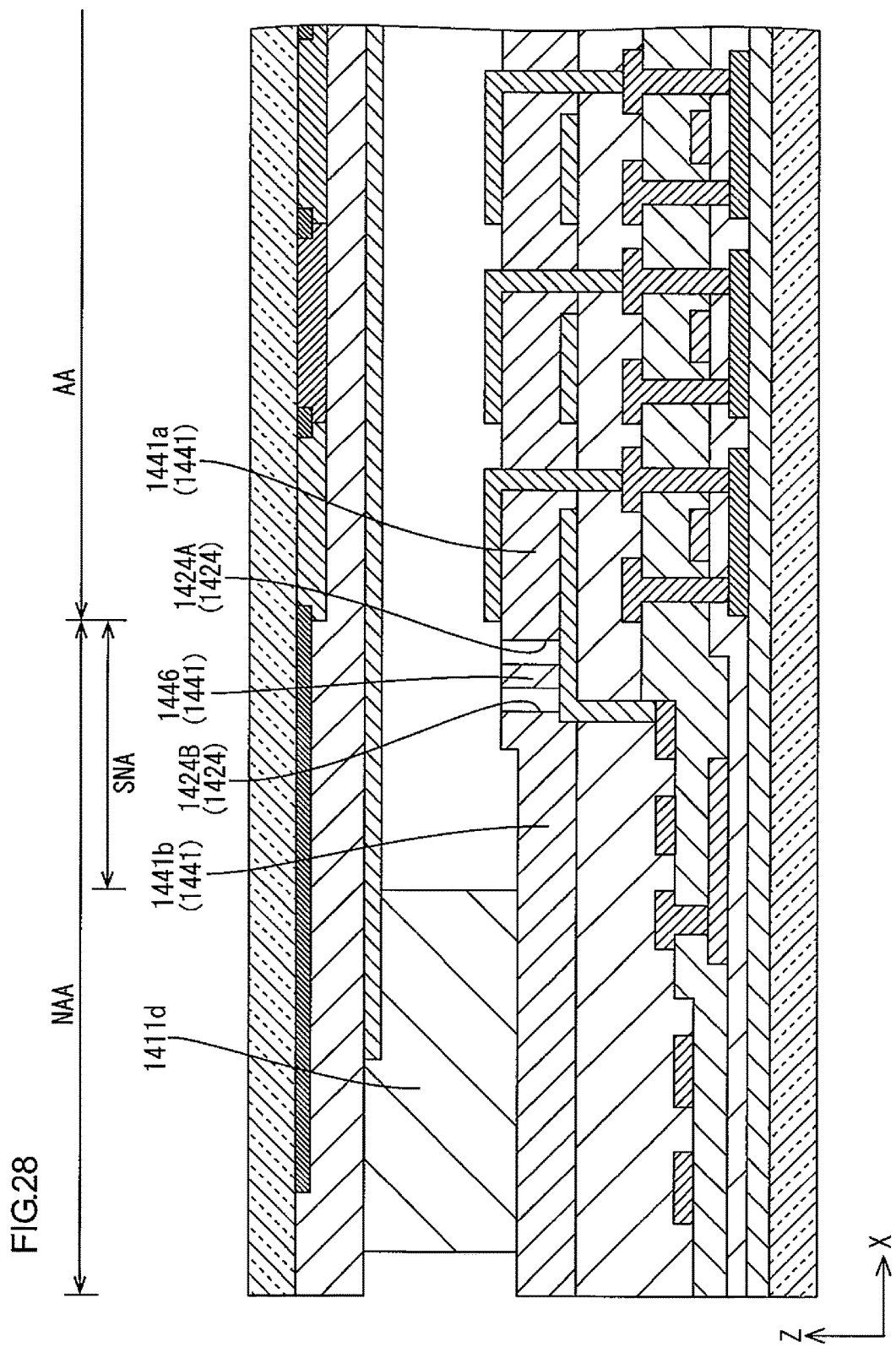

DISPLAY DEVICE

TECHNICAL FIELD

The present invention relates to a display device.

BACKGROUND ART

A liquid crystal panel that is a main component of a known liquid crystal display device has the following configuration. The liquid crystal panel includes a pair of glass substrates and liquid crystals that are sandwiched between the glass substrates and sealed with a sealing member provided around the liquid crystals. The substrates are an array substrate and a CF substrate. TFTs that are switching components, pixel electrodes, and traces are formed on the array substrate. Color filters are formed on the CF substrate. A liquid crystal panel disclosed in Patent Document 1 has been known as an example of such a liquid crystal panel.

In the liquid crystal panel disclosed in Patent Document 1, holes are formed in an inorganic insulating film and an organic insulating film formed in layers in an area of the array substrate in which the sealing member is provided. The holes have a depth such that they run through the inorganic film but not the organic film. With the holes, attachment of the sealing member to the array substrate improves.

RELATED ART DOCUMENT

Patent Document

Patent Document 1: Japanese Unexamined Patent Application Publication No. 2010-91896

Problem to be Solved by the Invention

In the liquid crystal panel disclosed in Patent Document 1, the sealing member is mainly bonded to the inorganic insulating film. The sealing member and the inorganic insulating film are made of materials having different linear expansion coefficients (thermal expansion rates). If a temperature in an environment in which the liquid crystal panel is used varies, a portion of the inorganic insulating film bonded to the sealing member may be subjected to stress and the stress may affect other portions of the inorganic insulating film in the display area. If the stress is stronger than the adhesiveness of the inorganic insulating film, the portions of the inorganic insulating film in the display area may be removed. If the portions of the inorganic insulating film in the display area are removed, displacement of a transparent electrode film above the inorganic insulating film may occur and result in display deficiencies. If a frame of the liquid crystal panel is further reduced in width and a dimension between the sealing member and the display area is reduced, the stress applied to the portion of the inorganic insulating film bonded to the sealing member is more likely to affect the portions of the inorganic insulating film in the display area and thus the display deficiencies are more likely to occur. This has been a difficult problem to solve.

DISCLOSURE OF THE PRESENT INVENTION

The technology disclosed in this description was made in view of the above circumstances. An object is to reduce display deficiencies.

Means for Solving the Problem

A display device according to the present invention includes a first substrate, a second substrate, a sealing member, a first transparent electrode film, a first insulating film, and a second transparent electrode film. The first substrate includes a section in a display area and a section in a non-display area that surrounds the display area. The second substrate is opposed to the first substrate with internal space between the first substrate and the second substrate. The sealing member is disposed between the first substrate and the second substrate in the non-display area to surround the internal space and seal the internal space. The first transparent electrode film is disposed at least in the display area on the first substrate. The sealing member is bonded to the first insulating film. The first insulating film is disposed closer to the first substrate than the first transparent electrode film in an area of the first substrate across a boundary between the display area and the non-display area. The first insulating film includes at least one slit arranged in the non-display area closer to the display area than to the sealing member. The second transparent electrode film is disposed closer to the first substrate than the first insulating film at least in the display area such that the first insulating film is sandwiched between the first transparent electrode film and the second transparent electrode film.

In this configuration, the internal space is provided between the first substrate and the second substrate that are opposed to each other and the sealing member is disposed to surround the internal space. The sealing member seals the internal space. The first insulating film is disposed in the area of the first substrate across the boundary between the display area and the non-display area. The sealing member is bonded to the first insulating film. The first insulating film is sandwiched between the first transparent electrode film and the second transparent electrode film.

If materials of the sealing member and the first insulating film have different linear expansion coefficients, a stress may be applied to a portion of the first insulating film to which the sealing member is bonded when variations in temperature occur. As a frame size is reduced and a dimension between the sealing member and the display area is reduced, the stress applied to the portion of the first insulating film to which the sealing member is bonded is more likely to affect a portion of the first insulating film in the display area. In comparison to a configuration that does not include the second transparent electrode film, in the configuration in which the first insulating film is sandwiched between the first transparent electrode film and the second transparent electrode film, the thickness of the first insulating film tends to be smaller. Therefore, the first insulating film is more likely to be removed due to the stress applied to the portion of the first insulating film to which the sealing member is bonded. The first insulating film includes the slit arranged closer to the display area than to the sealing member in the non-display area. Therefore, even if the stress described above is applied to the portion of the first insulating film to which the sealing member is bonded, the stress is less likely to be transmitted to the portion of the first insulating film in the display area. According to the configuration, the portion of the first insulating film in the display area is less likely to be removed and thus a problem such as displacement of the first transparent electrode film above the first insulating film is less likely to occur in the display area. Therefore, display deficiencies are less likely to occur. The configuration is especially preferable for reducing the frame size.

Preferable embodiments of a first display device may include the following configurations.

(1) The second transparent electrode film may include an electrode film extending portion that extends to the non-display area. The slit of the first insulating film is arranged to overlap the electrode film extending portion of the second transparent electrode film. During etching of a portion of the first insulating film by a photography method to form the slit, the electrode film extending portion of the second transparent electrode film which extends over a surface of the portion of the first insulating film closer to the first substrate in which the slit is to be formed functions as an etching stopper. The etching dose not proceed to the surface of the electrode film extending portion closer to the first substrate is less likely to be etched.

(2) The display device may further include a second insulating film and a common potential supplying portion. The second insulating film is disposed in an area of the first substrate across a boundary between the display area and the non-display area. The common potential supplying portion with a common potential is disposed on the second insulating film on the first substrate side in the non-display area on the first substrate. The electrode film extending portion is connected to the common potential supplying portion via a contact hole formed in the second insulating film. According to the configuration in which the electrode film extending portion is arranged in the area across the boundary between the display area and the no-display area and connected to the common potential supplying portion of the second insulating film on the first substrate side via the contact hole formed in the second insulating film arranged on the second transparent electrode film on the first substrate side, the common potential is supplied from the common electrode supplying portion to the second transparent electrode film that includes the electrode film extending portion. The electrode film extending portion has a function of protecting the surface of the electrode film extending portion on the first substrate side during formation of the slit in the first insulating film in addition to a function of transmitting the common potential to the second transparent electrode film. In comparison to a configuration in which different portions are provided for different functions, the configuration is simplified.

(3) The display device may further include a second insulating film disposed on the first insulating film on the first substrate side in an area across a boundary between the display area and the non-display area on the first substrate. The silt of the first insulating film is formed at a position overlapping the second insulating film. According to the configuration, high flexibility is provided in arrangement of the slit.

(4) The slit of the first insulating film may run through the first insulating film in a thickness direction of the first insulating film. In comparison to a configuration in which the slit does not run through the first insulating film in the thickness direction of the first insulating film and a thin portion (a portion thinner than a portion in which the slit is not formed) remains, a stress applied to a portion of the first insulating film to which the sealing member is bonded is less likely to a portion of the first insulating film in the display area. According to the configuration, the portion of the first insulating film in the display area is less likely to be removed and thus display deficiencies are more properly reduced.

(5) The first insulating film may include a thin portion in which the slit is formed with a thickness smaller than a thickness of a portion of the first insulating film in which the slit is not formed. During etching of a portion of the first insulating film by a photolithography method using a halftone mask or a gray-tone mask, the etching does not proceed to the surface of the first insulating film closer to the first substrate because of the thin portion that remains in the portion of the first insulating film in which the slit is formed. In comparison to a configuration in which the slit runs through the first insulating film in the thickness direction of the first insulating film, the surface of the first insulating film on the first substrate side is not exposed through the slit. According to the configuration, variations in quality of the film are less likely to occur. Therefore, degradation of display performance due to the slit is less likely to occur. Furthermore, high flexibility is provided in the arrangement of the slit.

(6) The slit of the first insulating film may be arranged closer to the sealing member than to the display area. According to the configuration that includes the thin portion formed in the portion of the first insulating film in which the slit is formed, high flexibility in the arrangement of the slit is achieved. Therefore, the slit can be arranged closer to the sealing member than to the display area. Even if the portion of the first insulating film to which the sealing member is bonded is removed due to the stress applied thereto, a removal area of the first insulating film is small because of the arrangement of the slit. Because the removal area of the first insulating film is limited, the removal is less likely to create an adverse effect on display performance even if the removal of the first insulating film occurs.

(7) The slit may continuously extend along the sealing member for an entire periphery of the sealing member of the slit may include slits arranged at intervals along the sealing member for the entire periphery of the sealing member. According to the configuration, the stress applied to the portion of the first insulating film to which the sealing member is bonded is less likely to affect the portion of the first insulating film in the display area due to the slit that continuously extends for the entire periphery of the sealing member or the slit that includes slits arranged at intervals for the entire periphery of the sealing member. Therefore, the portion of the first insulating film in the display area is less likely to be removed and thus the display deficiencies are reduced.

(8) The slit of the first insulating film may be formed in a groove shape that continuously extends for the entire periphery of the sealing member. Because the slit continuously extends without any breaks for the entire periphery of the sealing member, the stress applied to the portion of the first insulating film to which the sealing member is bonded is less likely to affect the portion of the first insulating film in the display area. According to the configuration, the portion of the first insulating film in the display area is less likely to be removed and thus the display deficiencies are properly reduced.

(9) The slit of the first insulating film may include the slits arranged at intervals along the sealing member for the entire periphery of the sealing member. With the slits arranged at intervals for the entire periphery of the sealing member, the stress applied to the portion of the first insulating film to which the sealing member is bonded is less likely to affect the portion of the first insulating film in the display area. Therefore, the portion of the first insulating film in the display area is less likely to be removed and the display deficiencies are less likely to occur.

(10) The second substrate may include a light blocking portion at least in the non-display area. The slit of the first insulating film may be arranged to overlap the light blocking portion. Optical effects added to light transmitting through the display device may be different between the portion in which the slit is formed and the portion in which the slit it not formed. This may cause uneven brightness. The slit of the first insulating film is formed to overlap the light blocking portion of the second substrate and thus the light is less likely to pass through the portion of the display device in which the slit is formed. According to the configuration, the light transmitting the display device is less likely to have uneven brightness and thus the display deficiencies are less likely to occur.

A second display device according to the present invention may include a first substrate, a second substrate, a sealing member, a first transparent electrode, a first insulating film, a second transparent electrode. The first substrate may include a section in a display area and a section in a non-display area surrounding the display area. The second substrate is opposed to the first substrate with internal space between the first substrate and the second substrate. The sealing member is disposed between the first substrate and the second substrate in the non-display area to surround the internal space and seal the internal space. The first insulating film is disposed on the first transparent electrode film on a first substrate side at least in a portion of the first substrate at least in the display area not overlapping the sealing member. The second transparent electrode film is disposed on the first insulating film on the first substrate side at least in the display area on the first substrate such that the first insulating film is sandwiched between the first transparent electrode film and the second transparent electrode film.

In this configuration, the internal space is provided between the first substrate and the second substrate that are opposed to each other. The sealing member is disposed between the first substrate and the second substrate to surround the internal space. The first insulating film is disposed in the portion of the first substrate at least in the display area and sandwiched between the first transparent electrode and the second transparent electrode.

The first insulating film is disposed in the area that does not overlap the sealing member, that is, the sealing member is not directly bonded to the first insulating film. In a configuration in which the sealing member is directly bonded to the first insulating film, if a stress is applied to portions of the sealing member and the first insulating member which are bonded together due to a variation in temperature, the portion of the first insulating film in the display area may be removed. As a result, a problem such as displacement of the first transparent electrode film above the first insulating film may occur. If the frame size is reduced and the dimension between the sealing member and the display area is reduced, the stress applied to the portions that are ponded together is more likely to affect the portion of the first insulating film in the display area. In comparison to a configuration that does not include the second transparent electrode film, the thickness of the first insulating film in the configuration in which the first insulating film is sandwiched between the first transparent electrode film and the second transparent insulating film tends to be smaller. Therefore, the first insulating film is more likely to be removed when the stress is applied to the portion of the first insulating film to which the sealing member is bonded. According to the configuration in which the first insulating film is not directly bonded to the sealing member, the stress is less likely to be transmitted from the sealing member to the first insulating film due to the variation in temperature. Therefore, the portion of the first insulating film in the display area is less likely to be removed and thus the problem such as displacement of the first transparent electrode film above the first insulating film is less likely to occur in the display area. The display deficiencies are less likely to occur. This configuration is especially preferable for reducing the frame size.

Preferable embodiments of a second display device may include the following configurations.

(1) The display device may further include a second transparent electrode film and a second insulating film. The second transparent electrode may be disposed on the first insulating film on the first substrate side at least in the display area such that first insulating film is sandwiched between the first transparent electrode film and the second transparent electrode film. The second insulating film to which the sealing member is bonded is disposed in an area of the first substrate across a boundary between the display area and the non-display area. The second insulating film has a thickness larger than a thickness of the first insulating film. In the configuration in which the first insulating film is sandwiched between the first transparent electrode film and the second transparent electrode film, the thickness of the second insulating film to which the sealing member is bonded is larger than the thickness of the first insulating film. Therefore, even if a stress is applied to a portion of the second insulating film to which the sealing member is bonded, a portion of the second insulating film in the display area is less likely to be removed. Namely, although the first insulating film having the smaller thickness is more likely to be removed due to the stress, the first insulating film is not directly bonded to the sealing member and thus the stress due to the variation in temperature is less likely to be transmitted from the sealing member to the first insulating film. As described above, the portion of the first insulating film in the display area is less likely to be removed and thus display deficiencies are less likely to occur.

Advantageous Effect of the Invention

According to the present invention, display deficiencies are less likely to occur.

BRIEF DESCRIPTION OF THE DRAWINGS

FIG. 28 is a cross-sectional view illustrating a cross-sectional configuration of an end portion of a liquid crystal panel according to a fifteenth embodiment of the present invention.

MODE FOR CARRYING OUT THE INVENTION

First Embodiment

Figure 1:
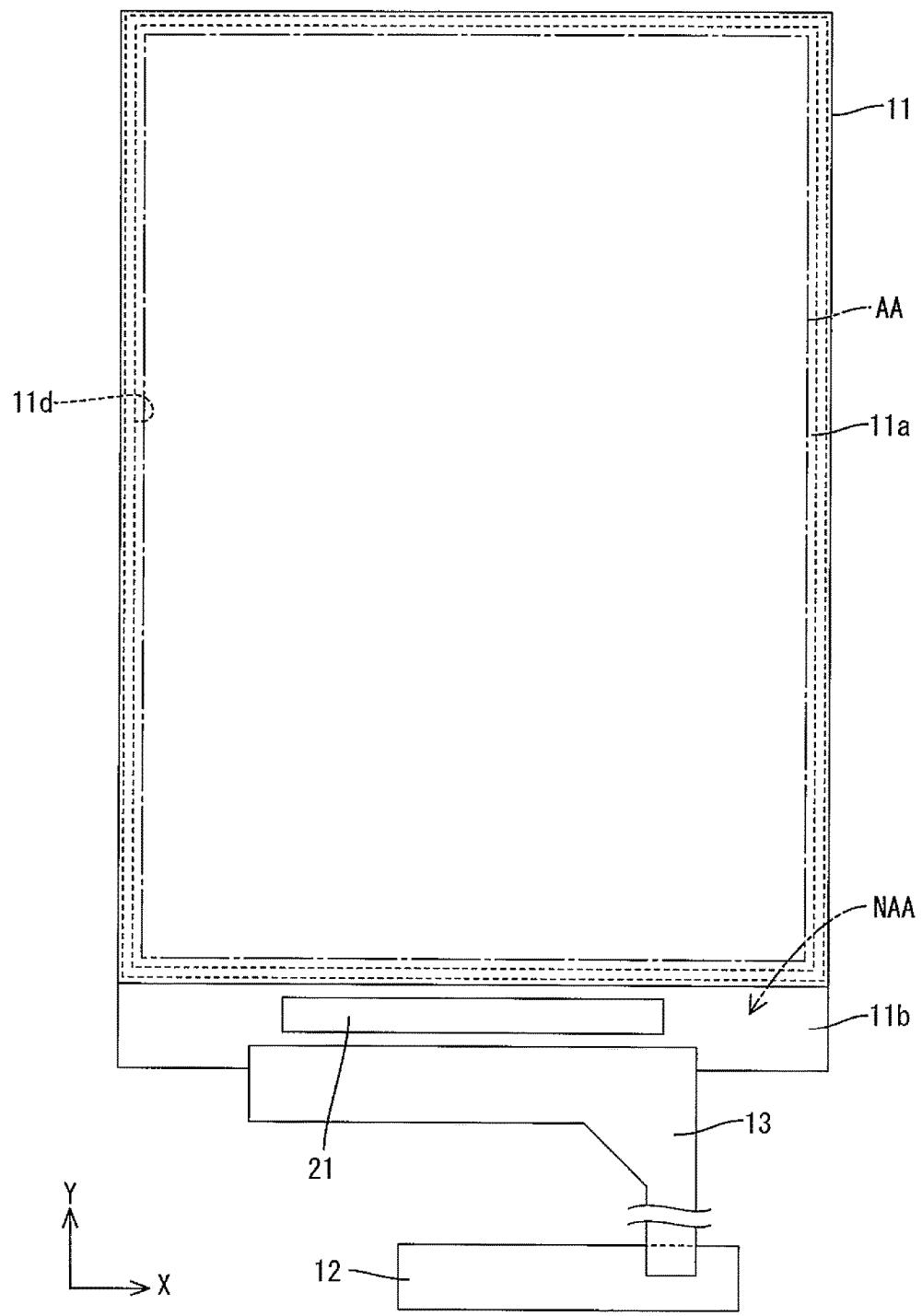
FIG. 1 is a schematic plan view illustrating connection among a liquid crystal panel on which a driver is mounted, a flexible board, and a control circuit board according to a first embodiment of the present invention.

A first embodiment will be described with reference to FIGS. 1 to 7. In this section, a liquid crystal display device 10 will be described. X-axes, Y-axes, and Z-axes may be present in the drawings. The axes in each drawing correspond to the respective axes in other drawings. The Y-axis direction corresponds to a vertical direction in FIGS. 2, 3 and 7. An upper side in 2, 3 and 7 corresponds to a front side of the liquid crystal display device 10. A lower side in FIGS. 2, 3 and 7 corresponds to a rear side of the liquid crystal display device 10.

Figure 2:
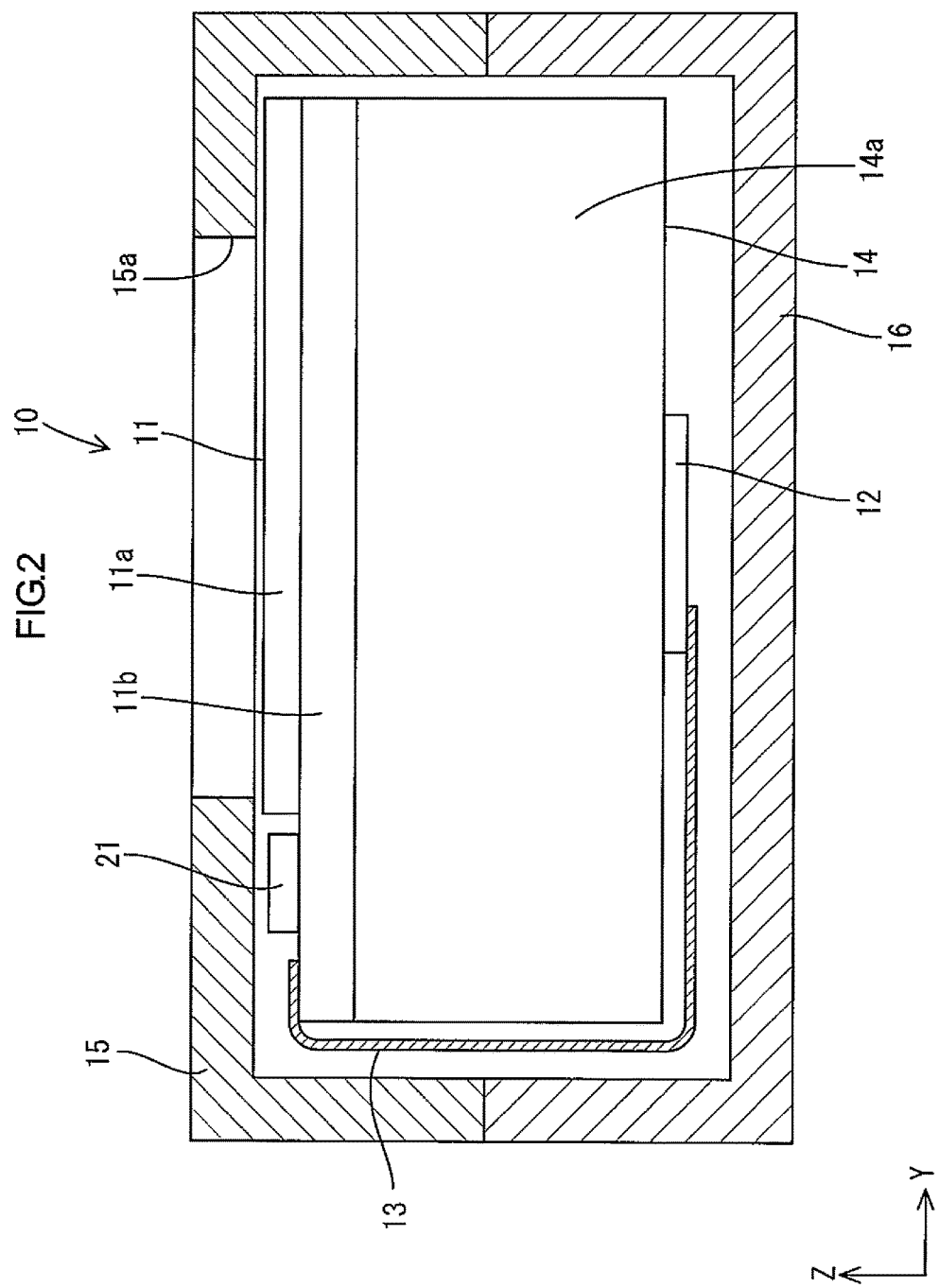
FIG. 2 is a schematic cross-sectional view illustrating a cross-sectional configuration along a long-side direction of a liquid crystal display device.

As illustrated in FIGS. 1 and 2, the liquid crystal display device 10 includes a liquid crystal panel (a display unit, a display panel) 11, a driver (a panel driver) 21, a control circuit board (an external signal supply) 12, a flexible circuit board (an external connecting member) 13, a backlight unit (a lighting unit) 14. The liquid crystal panel 11 includes a display area (an active area) AA and a non-display area (a non-active area) NAA. The display area AA is configured for display images and located in the middle of the liquid crystal panel 11. The non-display area NAA is located in an outer area of the liquid crystal panel 11 which surrounds the display area AA. The driver 21 is for driving the liquid crystal panel 11. The control circuit board 12 is for externally supplying various input signals to the driver 21. The flexible circuit board 13 establishes electrical connection between the liquid crystal panel 11 and the eternal control circuit board 12. The backlight unit 14 is an external light source for supplying light to the liquid crystal panel 11. The liquid crystal display device 10 further includes front and rear exterior components 15 and 16 that are used in a pair for holding the liquid crystal panel 11 and the backlight unit 14 that are fixed together. The front exterior component 15 has an opening 15a through which images displayed in the display area AA of the liquid crystal panel 11 can be viewed from the outside. The liquid crystal display device 10 according to this embodiment is for various kinds of electronic devices (not illustrated) including mobile phones (including smartphones), notebook computers (including tablet computers), handheld terminals (including electronic book readers and PDAs), digital photo frames, portable video game players, and electronic papers. Therefore, a screen size of the liquid crystal panel 11 of the liquid crystal display device 10 is in a range from some inches to ten plus some inches, that is, the size commonly categorized as small size or small-to-mid size.

The backlight unit 14 will be described. As illustrated in FIG. 2, the backlight unit 14 includes a chassis 14a, light sources that are not illustrated, and an optical member that are not illustrated. The chassis 14a has a box-like shape with an opening on the front side (a liquid crystal panel 11 side). The light sources (e.g., cold cathode tubes, LEDs, and organic ELs) are disposed inside the chassis 14a. The optical member is disposed over the opening of the chassis 14a. The optical member has a function for converting light from the light sources into planar light.

Figure 4:
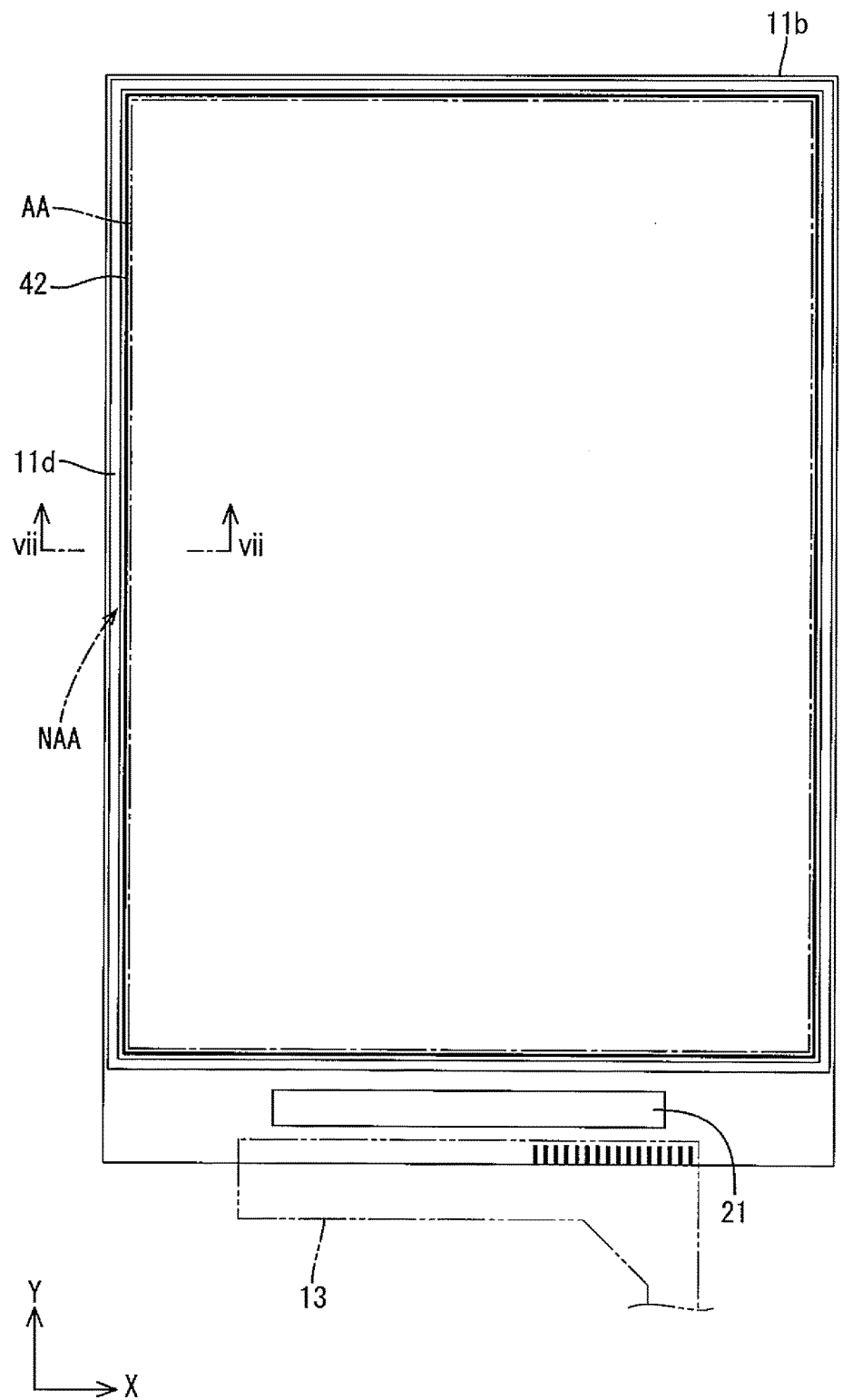
FIG. 4 is a plan view of an array substrate.

Next, the liquid crystal panel 11 will be described. As illustrated in FIG. 1, the liquid crystal panel 11 has a vertically-long quadrilateral (or rectangular) overall shape. The display area (an active area) AA is arranged off-centered to one of edges at an end of a long dimension of the liquid crystal panel 11 (on the upper side in FIG. 1). The driver 21 and the flexible circuit board 13 are mounted to a portion of the liquid crystal panel 11 closer to an edge at the other end of the long dimension of the liquid crystal panel 11 (on the lower side in FIG. 1). An area of the liquid crystal panel 11 outside the display area AA is the non-display area (non-active area) NAA in which images are not displayed. The non-display area NAA includes a frame-shaped area and an edge area. The frame-shape area surrounds the display area AA (a frame portion of the CF substrate 11a, which will be described later). The edge area is a reserved area closer to the other edge of the long dimension of the liquid crystal panel 11 (a portion of the array substrate 11b that does not overlap the CF substrate 11a, which will be described later). The reserved area includes a mounting area (an attachment area) to which the driver 21 and the flexible circuit board 13 are mounted. A width (or a frame width) of three sections of the frame-shaped non-display area of the liquid crystal panel 11 other than the mounting area for the driver 21 and the flexible circuit board 13 (non-mounting area end portions), more specifically, a linear distance from an outer edge of a glass substrate GS to an outer edge of the display area AA is equal to or smaller than 1.9 mm, more preferably, equal to or smaller than 1.3 mm. Namely, the liquid crystal panel 11 has a narrow frame structure including a significantly narrow frame. A short-side direction of the liquid crystal panel 11 corresponds to the X-axis direction in each drawing and a long-side direction of the liquid crystal panel 11 corresponds to the Y-axis direction in each drawing. In FIGS. 1 and 4, a chain line that forms a box slightly smaller than the CF substrate 11a indicates an outer boundary of the display area AA and the area outside the chain line is the non-display area NAA.

Next, components connected to the liquid crystal panel 11 will be described. As illustrated in FIGS. 1 and 2, the control circuit board 12 is mounted to the back surface of the chassis 14a of the backlight unit 14 (an outer surface far from the liquid crystal panel 11) with screws. The control circuit board 12 includes a substrate made of paper phenol of glass epoxy resin and electronic components for supplying various kinds of input signals to the driver 21 are mounted on the substrate. Furthermore, traces routed in predefined pattern (electrically conducting paths), which are not illustrated, are formed on the substrate. One of ends (one end) of the flexible circuit board 13 is electrically and mechanically connected to the control circuit board 12 via an anisotropic conductive film (ACF), which is not illustrated.

As illustrated in FIG. 2, the flexible circuit board (an FPC board) 13 includes a base made of synthetic resin having insulating properties and flexibility (e.g., polyimide resin) and multiple traces (not illustrated) formed on the base. As described earlier, one of ends of the flexible circuit board 13 at an end of a length direction thereof is connected to the control circuit board 12 disposed on the back surface of the chassis 14a. The other end of the flexible circuit board 13 (another end) is connected to the array substrate 11b of the liquid crystal panel 11. Therefore, the flexible circuit board 13 is folded in the liquid crystal display device 10 such that a cross-sectional shape is substantially U shape. The traces are exposed to the outside at the ends of the flexible circuit board 13 at the ends of the length direction and provides as terminals (not illustrated). The terminals are electrically connected to the control circuit board 12 and the liquid crystal panel 11. According to the configuration, the input signals supplied by the control circuit board 12 are transmitted to the liquid crystal panel 11.

As illustrated in FIG. 1, the driver 21 is an LSI chip including a drive circuit therein. The driver 21 is configured to operate based on signals supplied by the control circuit board 12 that is a signal source for processing the input signals supplied by the control circuit board 12 that is a signal source, generate output signals, and transmit the output signals to the display area AA of the liquid crystal panel 11. The driver 21 has a horizontally-long rectangular shape in a plan view (a longitudinal shape along the short edge of the liquid crystal panel 11) and is directly mounted on the liquid crystal panel 11 (the array substrate 11b, which will be described later) in the non-display area NAA, that is, through chip-on-glass (COG) mounting. A long-side direction of the driver 21 corresponds to the X-axis direction (the short-side direction of the liquid crystal panel 11) and a short-side direction thereof corresponds to the Y-axis direction (the long-side direction of the liquid crystal panel 11).

Figure 3:
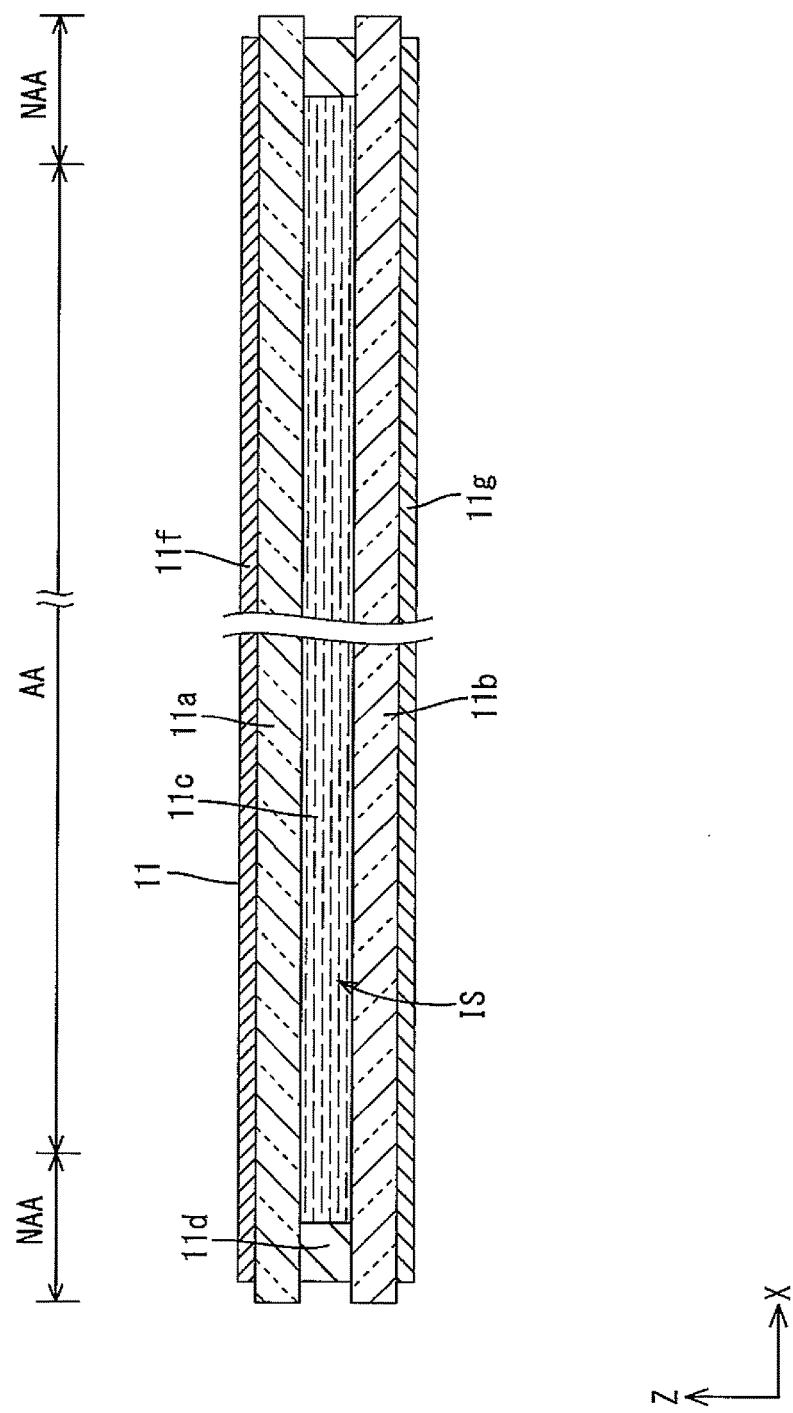
FIG. 3 is a schematic cross-sectional view illustrating a cross-sectional configuration of an entire liquid crystal panel.

The liquid crystal panel 11 will be described once again. As illustrated in FIG. 3, the liquid crystal panel 11 includes at least a pair of substrates 11a and 11b, a liquid crystal layer (liquid crystals) 11c, and a sealing member 11d. The liquid crystal layer 11c between the substrates 11a and 11b includes liquid crystal molecules that are substances having optical characteristics that change according to application of electric field. The sealing member 11d is arranged between the substrates 11a and 11b to surround internal space IS between the substrates 11a and 11b and the liquid crystal layer 11c. The sealing member 11d seals the internal space IS and the liquid crystal layer 11c. One of the substrates 11a and 11b at the front is the CF substrate (a second substrate, a counter substrate) 11a and one at the rear is the array substrate (a first substrate, a TFT substrate, an active matrix substrate) 11b. The CF substrate 11a and the array substrate 11b include sections in the display area AA and the non-display area NAA described earlier. Polarizing plates 11f and 11g are attached to outer surfaces of the substrates 11a and 11b, respectively.

The liquid crystal layer 11c is formed between the substrates 11a and 11b by a so-called drop injection method. Specifically, liquid crystals for the liquid crystal layer 11c are dropped onto the CF substrate 11a and then the array substrate 11b is bonded to the CF substrate 11a. As a result, the liquid crystals are spread out in the internal space IS between the substrates 11a and 11b and the liquid crystal layer 11c is formed. As illustrated in FIGS. 1 and 3, the sealing member 11d is formed in a vertically-long frame shape along the non-display area NAA in a plan view (i.e., viewed in a direction normal to plate surfaces of the substrates 11a and 11b) and arranged in the non-display area NAA of the liquid crystal panel 11. In a production process of the liquid crystal panel 11, the sealing member 11d is formed on the CF substrate 11a of the substrates 11a and 11b. With the sealing member 11d, a gap between the substrates 11a and 11b (or a thickness of the liquid crystal layer 11c), that is, a cell gap around outer peripheries of the substrates 11a and 11b is maintained constant. A width of the sealing member 11d is smaller than the smallest width of the non-display area NAA (specifically, a width of three sides of the non-display area NAA other than a side on which the driver 21 is arranged). The sealing member 11d is arranged such that inner edges of the sealing member 11d are located outer (away from the display area AA) than a boundary between the display area AA and the non-display area NAA. A portion of the non-display area NAA inner (closer to the display area AA) than the sealing member 11d is a sealing member non-arranged area SNA having a frame shape along the sealing member 11d in a plan view. A width of the sealing member non-arranged area SNA is equal to a distance between the inner edge of the sealing member 11d and the boundary between the display area AA and the non-display area NAA. The sealing member 11d contains an ultraviolet curable resin (a curable resin) which is hardened through application of ultraviolet rays. The ultraviolet curable resin contained in the sealing member 11d is in a liquid state with flowability before application of the ultraviolet rays. When the ultraviolet rays are applied, the ultraviolet curable resin hardens and enters into a solid state. Portions of the sealing member 11d arranged on other three sides of the liquid crystal panel 11 other than the side on which the driver 21 and the flexible circuit board 13 are mounted (non-mounting sides) are arranged outermost portions of the non-display area NAA (FIG. 1).

Figure 7:
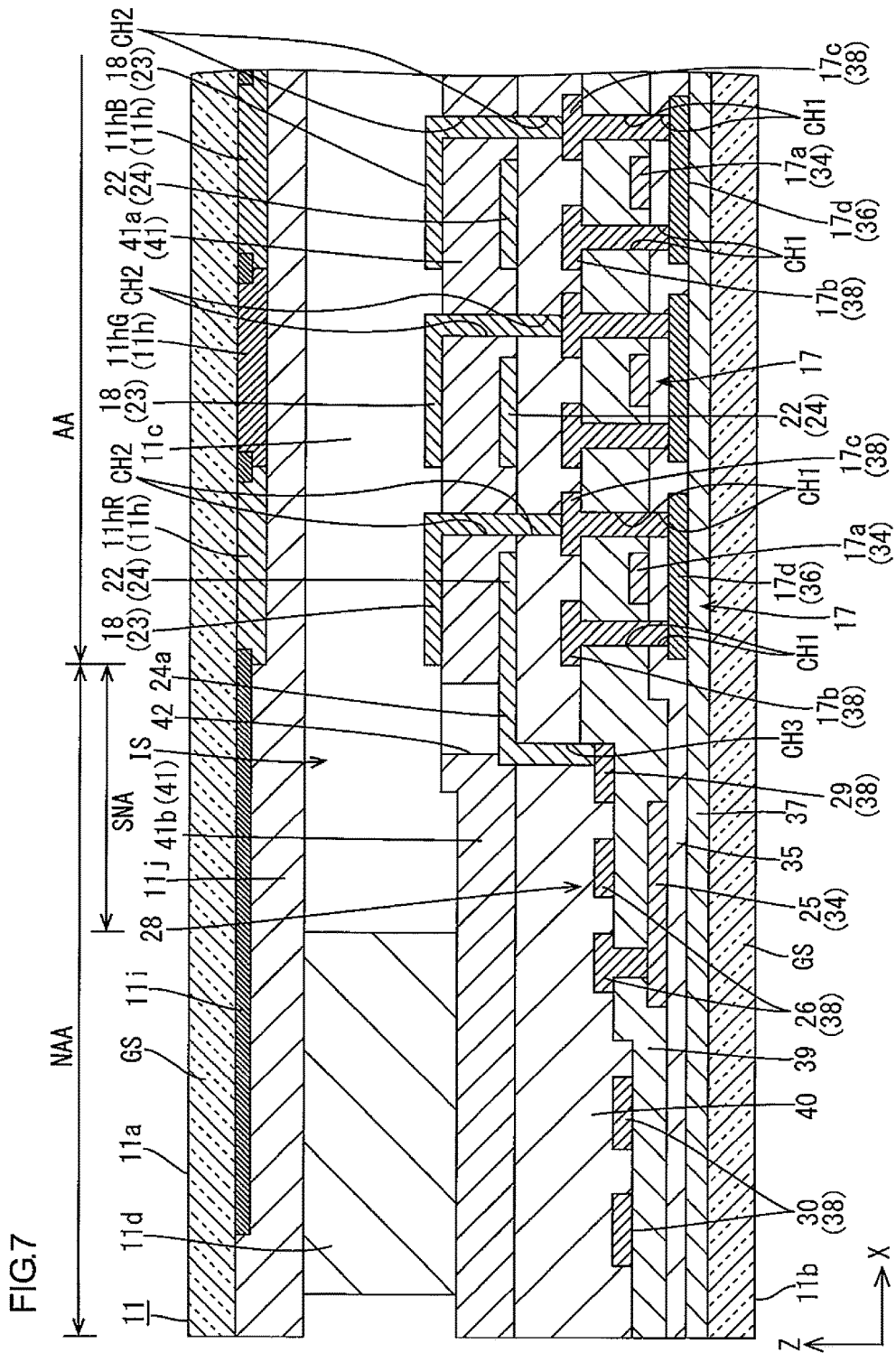
FIG. 7 is a cross-sectional view along line vii-vii in FIG. 4.

The CF substrate 11a and the array substrate 11b include substantially transparent glass substrates (having high light transmissivity) GS (substrates), respectively. Various kinds of films (structures) are formed in layers on the glass substrates GS. As illustrated in FIGS. 1 and 2, the CF substrate 11a has a short dimension about equal to that of the array substrate 11b and a long dimension smaller than that of the array substrate 11b. The CF substrate 11a is bonded to the array substrate 11b with one of ends of the long dimension (an upper end in FIG. 1) aligned with that of the array substrate 11b. The CF substrate 11a does not overlap an end portion of the array substrate 11b at the other end of the long dimension of the array substrate 11b (a lower end in FIG. 1), that is, front and back surfaces of the end portion of the array substrate 11b are exposed to the outside. The end portion of the array substrate 11b includes a mounting area in which the driver and the flexible circuit board 13 are mounted. FIG. 7 schematically illustrates the films (structures) included in the substrates 11a and 11b. Dimensions (e.g., thicknesses and heights) and arrangements of the structures in the drawing may be different from actual dimensions and arrangements.

The liquid crystal panel 11 according to this embodiment operates in fringe field switching (FFS) mode that is an operation mode improved from an in-plane switching (IPS) mode. As illustrated in FIG. 7, the liquid crystal panel 11 includes pixel electrodes 18 (first transparent electrode film 23) and a common electrode 22 (a second transparent electrode film 24), which will be described later, formed on the array substrate 11b that is one of the substrates 11a and 11b. The pixel electrodes 18 and the common electrode 22 are formed in different layers. An actual sequence of layers on the substrates 11a and 11b will be described below.

The films formed in layers on an inner surface of the CF substrate 11a (on the liquid crystal layer 11c side, facing the array substrate 11b) by a known photolithography method will be described. As illustrated in FIG. 7, a light blocking portion (a black matrix) 11i, a color filter 11h, and a CF substrate-side planarization film (an overcoat film) 11j are formed in layers in this sequence from a lower layer (the glass substrate GS, a front side). An alignment film made of polyimide is formed in solid pattern in a layer upper than the CF substrate-side planarization film 11j to face the liquid crystal layer 11c for alignment of the liquid crystal molecules in the liquid crystal layer 11c, although it is not illustrated. Photo spacers each having column shapes project from a layer upper than the CF substrate-side planarization film 11j toward the array substrate 11b while penetrating the liquid crystal layer 11c. The photo spacers maintain the cell gap constant in the display area AA.

As illustrated in FIG. 7, the light blocking portion 11i is formed in an area of a surface of the glass substrate GS of the CF substrate 11a across a boundary between the display area AA and the non-display area NAA. The light blocking portion 11i is made of photosensitive resin with a light blocking material (e.g., carbon black) added thereto and thus has a high light-blocking capability. A portion of the light blocking portion 11i in the display area AA is formed in a grid shape in a plan view by patterning. A portion of the light blocking portion 11i in the non-display area NAA is formed in a frame shape in a plan view similar to the sealing member 11d by patterning. The color filter 11h is formed in an island pattern corresponding to the pixel electrodes 18 on the array substrate 11b by patterning. Specifically, the color filter 11h includes a number of color portions 11hR, 11hG, and 11hB arranged in a matrix on the CF substrate 11a in the display area AA to overlap the pixel electrodes 18 on the array substrate 11b in a plan view. Each of the color portions 11hR, 11hG, and 11hB has a vertically-long rectangular shape in a plan view (not illustrated). The color portions 11hR, 11hG, and 11hB of the color filter 11h are arranged in a repeating manner along a row direction (the X-axis direction) to form color portion groups. A number of the color portion groups are arranged along a column direction (the Y-axis direction). In the display area AA, the adjacent color portions 11hR, 11hG, and 11hb are separated by the portion of the light blocking portion 11i having the grid shape to reduce color mixture among pixels. The light blocking portion 11i and the color filter 11h are patterned on the CF substrate 11a by the known photolithography method in the production process. The CF substrate-side planarization film 11j is formed in a layer upper than the light blocking portion 11i and the color filter 11h. The CF substrate-side planarization film. 11j is formed in a solid pattern across the display area AA and the non-display area NAA. The CF substrate-side planarization film 11j may be made of acrylic resin such as polymethylmethacrylate resin (PMMA). The CF substrate-side planarization film 11j has a thickness larger than the thickness of the color filter 11h or the light blocking portion 11i. With this configuration, the CF substrate-side planarization film 11j properly planarizes a surface of the CF substrate 11a on the liquid crystal layer 11c side (a surface to which the alignment film is formed). The sealing member 11d is bonded to the portion of the CF substrate-side planarization film 11j in the layer upper than the color filter 11h and the light blocking portion 11i overlapping the sealing member 11d in a plan view in the non-display area NAA.

Next, the various kinds of films formed in layers on the inner surface of the array substrate (on the liquid crystal layer 11c side, the surface facing the CF substrate 11a) by the known photolithography method will be described in detail. As illustrated in FIG. 7, the following films are formed in layers on the array substrate 11b: a first transparent electrode film 23; a first interlayer insulating film (a first insulating film, an inorganic insulating film) 41; a second transparent electrode film 24; a planarization film (a second insulating film, an organic insulating film) 40; a passivation film (an organic passivation film or an inorganic passivation film, not illustrated); a first metal film (a source metal film) 38; a second interlayer (an inorganic insulating film) 39; a second metal film (a gate metal film) 34; a gate insulating film (an inorganic insulating film) 35; a semiconductor film 36; and a basecoat film 37. The films are formed in the above sequence from the upper layer (on the liquid crystal layer 11c side or the front side). The alignment film is formed in a layer upper than the first interlayer insulating film 41 and the first transparent electrode film 23 in a solid pattern facing the liquid crystal layer 11c. The alignment film is for alignment of the liquid crystal molecules in the liquid crystal layer 11c. The alignment film may be made of polyimide.

The basecoat film 37 is formed in a solid pattern that covers an entire surface of the glass substrate GS of the array substrate 11b. The basecoat film 37 may be made of silicon oxide (SiO2), silicon nitride (SiNx), or silicon nitride oxide (SiNO). The semiconductor film 36 is formed on the basecoat film 37 in an upper layer. The semiconductor film 36 is formed in an island pattern corresponding to the arrangements of the TFTs 17, which will be described later, at least in the display area AA. The semiconductor film 36 is formed from a continuous grain silicon (CG silicon) thin film that is one kind of polycrystalline silicon thin films. The CG silicon thin film may be formed by adding a metal material to an amorphous silicon thin film and thermally processing the amorphous silicon under a low temperature of 550° C. or lower. Through the process, the CG silicon thin film obtains continuous atomic arrangement at grain boundaries. The gate insulating film 35 is formed on the basecoat film 37 and the semiconductor film 36 in an upper layer. The gate insulating film 35 is formed in a solid pattern across the display area AA and the non-display area NAA. The gate insulating film 35 may be made of silicon oxide (SiO2).

The second metal film 34 is patterned on the gate insulating film 35 in an upper layer to be arranged in the display area AA and the non-display area NAA. The second metal film 34 may be formed from a multilayered film of titanium (Ti) and copper (Cu). The second interlayer insulating film 39 is formed on the gate insulating film 35 and the second metal film 34 in an upper layer across the display area AA and the non-display area NAA in a solid pattern. The second interlayer insulating film 39 may be made of silicon oxide. The first metal film 38 is patterned on the second interlayer insulating film 39 in an upper layer to be arranged in the display area AA and the non-display area NAA. The first metal film 38 may be formed from a multilayered film of titanium (Ti) and copper (Cu). The passivation film is formed on the first metal film 38 in a solid pattern in an upper layer across the display area AA and the non-display area NAA. The passivation film may be made of silicon oxide (SiO2). The passivation film is for using the first metal film 38 outside the cell (or the sealing member) for reducing a load of wiring. The planarization film 40 is formed on the second interlayer insulating film 39 and the first metal film 38 in a solid pattern in an upper layer across the display area AA and the non-display area. The planarization film 40 may be made of acrylic resin such as polymethylmethacrylate resin (PMMA). A preferable range of the thickness of the planarization film 40 is from 2 μm to 3 μm. The thickness of the planarization film 40 in this embodiment is about 2.5 μm. The second transparent electrode film 24 is formed on the planarization film 40 in a substantially solid pattern in an upper layer across the display area AA and the non-display area NAA. The second transparent electrode film 24 may be made of transparent electrode material such as indium tin oxide (ITO) and zinc oxide (ZnO). The first interlayer insulating film 41 is formed on the planarization film 40 and the second transparent electrode film 24 in a solid pattern in an upper layer across the display area AA and the non-display area NAA. The first interlayer insulating film 41 may be made of silicon nitride (SiNx). A preferable range of the thickness of the first interlayer insulating film 41 is from 0.05 μm to 1 μm. In consideration of reliability in insulating performance, production cost, and takt time regarding the production, the preferable range is from 0.05 μm to 0.2 μm. The thickness of the first interlayer insulating film 41 in this embodiment is about 0.1 μm. The second transparent electrode film 24 is sandwiched between the planarization film 40 in the lower layer and the first interlayer insulating film 41 in the upper layer. The first transparent electrode film 23 is formed on the first interlayer insulating film 41 in an island pattern in an upper layer in the display area AA. The first transparent electrode film 23 is made of transparent electrode material such as indium tin oxide (ITO) or zinc oxide (ZnO).

Among the gate insulating film 35, the second interlayer insulating film 39, the planarization film 40, and the first interlayer insulating film 41, as illustrated in FIG. 7, the planarization film 40, which is an organic insulating film, has a thickness larger than the thicknesses of the other insulating films 35, 39 and 41, which are inorganic insulating films. With the configuration, the planarization film 40 properly planarizes the surface of the array substrate 11b on the liquid crystal layer 11c side (the surface on which the alignment film is formed). In comparison to the other insulating films 35, 39 and 41, the planarization film 40 is less likely to be removed when a stress is applied. Among the gate insulating film 35, the second insulating film 39, the planarization film 40, and the first interlayer insulating film 41, the first interlayer insulating film 41 formed in the uppermost layer includes a portion arranged in the non-display area NAA to which a portion of the sealing member 11d overlapping the portion of the first interlayer insulating film 41 in a plan view is bonded. The gate insulating film 35, the second interlayer insulating film 39, the planarization film 40, and the first interlayer insulating film 41 includes holes including contact holes CH1 to CH3 formed at predefined positions by patterning in the production process of the array substrate 11b.

Figure 5:
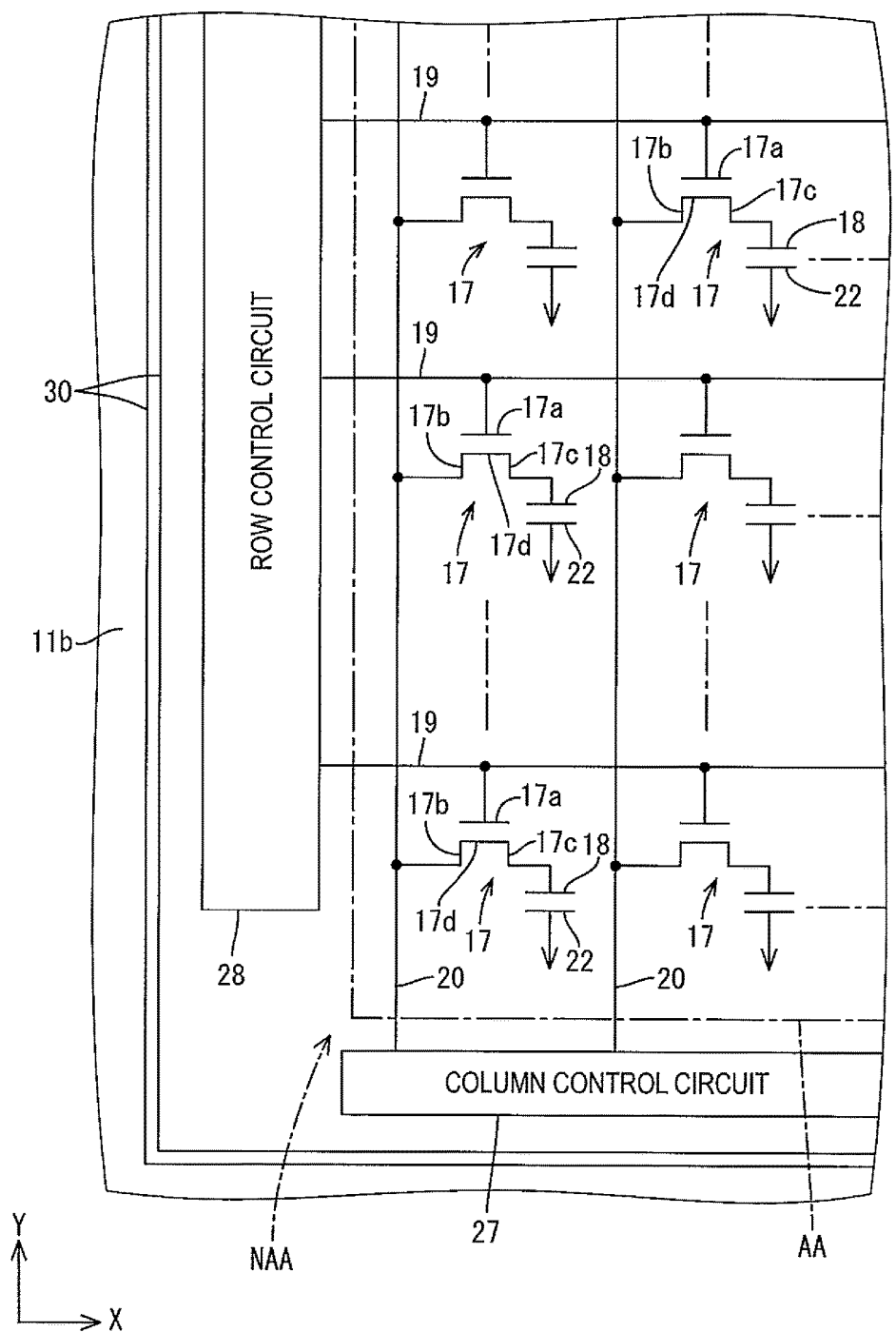
FIG. 5 is a plan view schematically illustrating a wiring configuration among a sealing member, a row control circuit, and a column control circuit arranged in a non-display area and TFTs arranged in a display area on the array substrate.

Next, components on the array substrate 11b in the display area AA will be described in detail. As illustrated in FIG. 5, a number of the TFTs (thin film transistors, display components) 17 and a number of the pixel electrodes 18 are arranged in a matrix on the array substrate 11b in the display area AA. Furthermore, the gate lines (scan signal lines, row control lines) 19 and the source lines (column control lines, date lines) 20 are arranged in a grid to surround the TFTs 17 and the pixel electrodes 18. Namely, the TFTs 17 and the pixel electrodes 18 are arranged at the respective intersections of the gate lines 19 and the source lines 20 and in a grid. The gate lines 19 are formed from the second metal film 34. The source lines 20 are formed from the first metal film 38. The second interlayer insulating film 39 is arranged between the second metal film 34 and the first metal film 38 at the intersections of the gate lines 19 and the source lines 20. The gate lines 19 and the source lines 20 are connected to gate electrodes 17a and source electrodes 17b of the TFTs 17, respectively. The pixel electrodes 18 are connected to drain electrodes 17c of the TFTs. These configurations will be described in detail later. The gate electrodes 17a are formed from the second metal film 34, which also forms the gate lines 19. The source electrodes 17b and the drain electrodes 17c are formed from the first metal film 38, which also forms the source lines 20 (see FIG. 7). Furthermore, an auxiliary capacitor line, which is not illustrated, is formed in the display area AA to be parallel to the gate lines 19 and overlap some pixel electrodes 18 in a plan view. The auxiliary capacitor line is formed from the second metal film 34, which also forms the gate lines 19.

As illustrated in FIG. 7, the TFTs 17 in the display area AA are so-called top gate-type (a staggered type). Each TFT 17 includes a channel 17d formed from the semiconductor film 36, the gate electrode 17a, the source electrode 17b, and the drain electrode 17c. The gate electrode 17a is arranged over the channel 17d via the gate insulating film 35 in the upper layer. The source electrodes 17b and the drain electrodes 17c are arranged in the layer above the gate electrode 17a via the second interlayer insulating film 39. The source electrodes 17b and the drain electrode 17c are connected to the channel 17d through the contact holes CH1 formed in the gate insulating film 35 and the second interlayer insulating film 39. With this configuration, electrons can flow between the source electrodes 17b and the respective drain electrodes 17c. The semiconductor film 36 that forms the channel 17d is formed from the CG silicon thin film, which has been described earlier. In comparison to the amorphous silicon thin film, the CG silicon thin film has higher electron mobility, which is about 200 to 300 cm2/Vx. With the channels 17d formed from the semiconductor film 36, that is, the CG silicon thin film, the TFTs 17 can be reduced in size and amounts of transmitting light through the pixel electrodes can be increased at the maximum. This configuration is preferable for improving the definition and reducing power consumption. The pixel electrodes 18 formed from the first transparent electrode film 23 are connected to the drain electrodes 17*c* of the respective TFTs 17 through the contact holes CH2 formed in the planarization film 40 and the first interlayer insulating film 41. According to the configuration, when the gate electrode 17*a* of each TFT 17 is activated, a current flows between the source electrode 17*b* and the drain electrode 17*c* and a predefined potential is applied to the pixel electrode 18. The pixel electrode 18 has a vertically-long rectangular outline along the outline of opposed one of the color portions 11*h*R, 11*h*G, and 11*h*B of the color filter 11*h*. The pixel electrode 18 and the opposed one of the color portions 11*h*R, 11*h*G, and 11*h*B form a pixel (a unit pixel). The common electrode 22 formed from the second transparent electrode film 24 is arranged to overlap the pixel electrode 18 in a plan view with the first interlayer insulating film 41 sandwiched between the common electrode 22 and the pixel electrode 18. A common potential (a reference potential) is supplied from a common potential supplying portion 29, which will be described later, to the common electrode 22. Therefore, by controlling the potential applied to the pixel electrode 18 with the TFT 17, which is described earlier, a specific potential difference occurs between the electrodes 18 and 22. When the potential difference occurs between the electrodes 18 and 22, a fringe electrical field (a lateral electric field) including a component in the direction normal to the plate surface of the array substrate 11*b* in addition to a component along the plate surface of the array substrate 11*b* is applied to the liquid crystal layer 11*c*. According to the configuration, the alignment of the liquid crystal molecules in the liquid crystal layer 11*c* can be properly altered. As described earlier, portions of the common electrode 22 that is formed in the substantially solid pattern corresponding to the contact holes CH2 of the planarization film 40 and the first interlayer insulating film 41 includes holes for contacts of the pixel electrodes 18.

Next, components on the array substrate 11*b* in the non-display area NAA will be described in detail. As illustrated in FIG. 5, the column control circuit 27 is arranged on a portion of the array substrate 11*b* in the non-display area NAA adjacent to the short edge of the display area AA and the row control circuit (a circuit) 28 is arranged on a portion of the array substrate 11*b* in the non-display area NAA. The column control circuit 27 and the row control circuit 28 are connected to the source lines 20 and the gate lines 19, respectively, to control on supply of signals output from the driver 21 to the TFTs. The column control circuit 27 and the row control circuit 28 are monolithically formed on the array substrate 11*b* with the semiconductor film 36 as a base similar to the TFTs 17. The column control circuit 27 and the row control circuit 28 include circuits for controlling signals output to the TFTs 17 and circuit components. The circuit components include TFTs for circuits (thin film transistors for circuits), which are not illustrated, using the semiconductor film 36 for channels. As illustrated in FIG. 7, the control circuits include first lines 25 for circuits formed from the second metal film 34 and second lines 26 for circuits formed from the first metal film 38. The column control circuit 27 and the row control circuit 28 are arranged across a portion of the non-display area NAA inside the sealing member 11*d* and a portion of the non-display area NAA outside the sealing member non-arranged area SNA. The column control circuit 27 includes a switching circuit (an RGB switching circuit) for distributing image signals included in the signals output from the driver 21 to the source lines 20 corresponding to R, G, and B. The column control circuit 27 may include auxiliary circuits such as a level shifter circuit and an ESD protection circuit. The row control circuit 28 includes a scanning circuit for scanning the gate lines 19 in sequence by supplying scan signals included in the signals output from the driver 21 to the gate lines 19 at predefined timing. The row control circuit 28 may include auxiliary circuits such as a level shifter circuit and an ESD protection circuit. The column control circuit 27 and the row control circuit 28 are connected to the driver 21 via connecting lines formed on the array substrate 11*b*, which are not illustrated.

As illustrated in FIG. 7, the common potential supplying portion 29 is formed on the array substrate 11*b* in the non-display area NAA for supplying a common potential to the common electrode 22. The common potential supplying portion 29 is formed from the first metal film 38 in a portion of the non-display area NAA inside the sealing member non-arranged area SNA, that is, between the row control circuit 28 and the display area AA. The second transparent electrode film 24 that forms the common electrode 22 includes an electrode film extending portion 24*a* that extends to the non-display area NAA. The electrode film extending portion 24*a* is arranged such that an end portion of the electrode film extending portion 24*a* overlaps the common potential supplying portion 29 in a plan view. The end portion of the electrode film extending portion 24*a* is connected to the common potential supplying portion 29 via the contact hole CH3 formed in the planarization film 40. As illustrated in FIGS. 5 and 7, shielding members 30 are disposed in the non-display area NAA for shielding the internal space IS of the liquid crystal panel 11. The shielding members 30 are formed from the second metal film 34 in frame shapes along the sealing member 11*d* in a plan view. The shielding members 30 overlap an outer portion of the seat member 11*d* in a plan view in non-display area NAA. The column control circuit 27, the row control circuit 28, the common potential supplying portion 29, and the shielding portion 30 described above are patterned on the array substrate 11*b* by the known photolithography method simultaneously with the patterning of the films in the production process of the array substrate 11*b*. In this embodiment, the shielding members 30 are formed from the second metal film 34. However, the shielding member 30 or portions of the shielding member 30 may be formed from the first metal film 38. Especially, to form portions of the shielding member 30 formed from the first metal film. 38, it is preferable to form the shielding member 30 on the outer side from the second metal film 34 and the shielding member 30 on the inner side from the first metal film 38.

The sealing member 11*d* bonded to the first interlayer insulating film 41 on the array substrate 11*b* and the first interlayer insulating film 41 are made of materials having different linear expansion coefficients (thermal expansion rates). If the temperature of the environment in which the liquid crystal panel 11 is used has varied, the stress is applied to a portion of the first interlayer insulating film 41 to which the sealing member 11*d* is bonded. If the stress affects portions of the first interlayer insulating film 41 in the display area AA, the portions of the first interlayer insulating film 41 may be removed. If the portion of the first interlayer insulating film 41 in the display area AA is removed, a problem such as displacement of the first transparent electrode film 23 on the first interlayer insulating film 41 may occur. If a frame size of the liquid crystal panel 11 is further reduced and the dimension between the sealing member 11*d* and the display area AA is reduced, the stress applied to the portion of the first interlayer insulating film 41 to which the sealing member 11d is bonded is more likely to affect the portions of the first interlayer insulating film 41 in the display area AA. As a result, the display deficiencies are more likely to occur.

Figure 6:
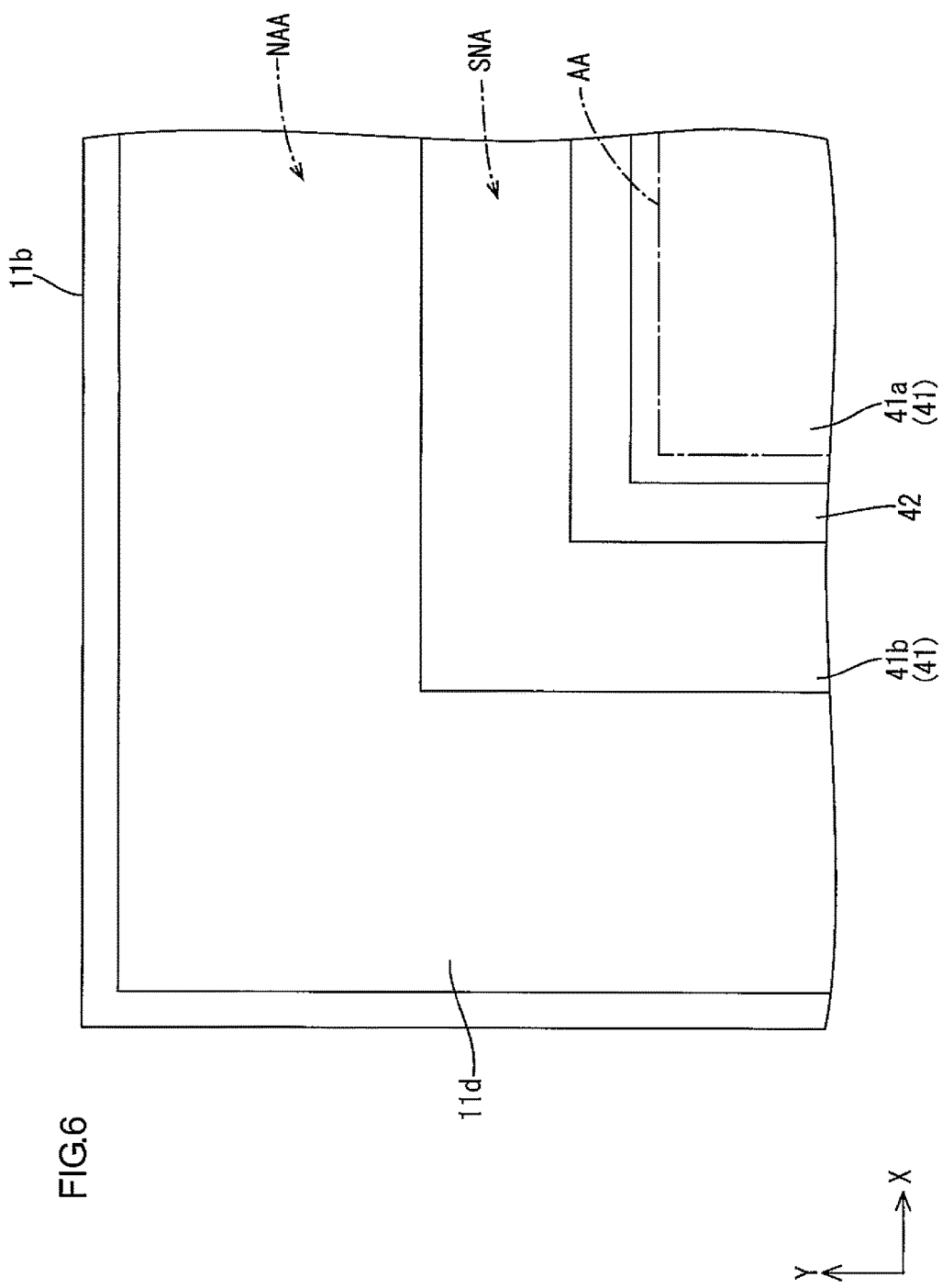
FIG. 6 is a magnified plan view illustrating a corner of the array substrate and therearound.

As illustrated in FIGS. 5 to 7, the first interlayer insulating film 41 in this embodiment includes a slit 42 in a portion closer to the display area AA than to the sealing member 11d in the non-display area NAA. With this slit 42, even if the stress is applied to the portion of the first interlayer insulating film 41 to which the sealing member 11d is bonded due to the variation in temperature, the stress is less likely to affect the portion of the first interlayer insulating film 41 in the display area AA. Therefore, the portion of the first interlayer insulating film 41 in the display area AA is less likely to be removed and thus the failure of the first transparent electrode film 23 on the first interlayer insulating film 41 such as shifting of the position is less likely to occur. Therefore, the display deficiencies are less likely to occur. The configuration is preferable for reducing the frame size. The configuration of the slit 42 will be described in detail below.

As illustrated in FIGS. 5 to 7, the slit 42 is arranged in a portion of the array substrate 11b in the non-display area NAA closer to the display area AA than to the sealing member 11d, that is, in the sealing member non-arranged area SNA, specifically, an inner edge portion of the sealing member non-arranged area SNA adjacent to the display area AA. The slit 42 is arranged in a portion of the sealing member non-arranged area SNA adjacent to a periphery of the display area AA (a portion the closest to the display area AA). The slit 42 is formed in a groove shape with a frame shape in a plan view continuously extending along the sealing member 11d for an entire periphery of the sealing member 11d. Namely, the slit 42 is formed to surround the display area AA from an outer side for an entire periphery of the display area AA. The slit 42 runs through the first interlayer insulating film 41 in the thickness direction of the first interlayer insulating film 41 (the Z-axis direction, the direction normal to the plate surface of the array substrate 11b). The first interlayer insulating film 41 is divided into an inner portion 41a and an outer portion 41b. The inner portion 41a is arranged mainly in the display area AA. The outer portion 41b is arranged entirely in the non-display area NAA. The sealing member 11d is bonded to the outer portion 41b. Even if a stress is applied to the outer portion 41b of the first interlayer insulating film 41 including a portion to which the sealing member 11d is bonded due to a variation in temperature, the stress is less likely to be transmitted to the inner portion 41a that is separated by the slit 42. Therefore, removal of the inner portion 41a of the first interlayer insulating film 41 arranged in the display area AA is further less likely to occur and the display deficiencies are further less likely to occur. The slit 42 is formed simultaneously with the contact holes CH 2 (i.e., in the same step) through patterning of the first interlayer insulating film 41 by the known photolithography method in the production process of the array substrate 11b.

As illustrated in FIG. 7, the slit 42 is arranged at a position that overlaps the electrode film extending portion 24a of the second transparent electrode film 24 in a plan view in the non-display area NAA. The slit 42 runs through the first interlayer insulating film 41 in the thickness direction of the first interlayer insulating film 41 as described earlier. Therefore, the electrode film extending portion 24a in the lower layer faces (or is exposed to) the liquid crystal layer 11c through the slit 42. Namely, the electrode film extending portion 24a is present under a portion of the first interlayer insulating film 41 in which the slit 42 is to be formed during formation of the slit 42 in the first interlayer insulating film 41 by the photolithography method and the first interlayer insulating film 41 is partially etched. According to the configuration, the electrode film extending portion 24a functions as an etching stopper and thus the planarization film 40 under the electrode film extending portion 24a is less likely to be etched. Therefore, evenness in thickness of the planarization film 40 is properly maintained. Since the electrode film extending portion 24a has a function to protect the planarization film 40 under the electrode film extending portion 24a from being etched during the formation of the slit 42 in the first interlayer insulating film 41 in addition to the function for passing the common potential from the common potential supplying portion 29 to the second transparent electrode film 24. In comparison to a configuration that includes different components having those functions, respectively, the configuration is simplified. Furthermore, the slit 42 is arranged at a position that overlaps a portion of the light blocking portion 11i on the CF substrate 11a in the non-display area NAA in a plan view. In an area of the liquid crystal panel 11 in which the slit 42 is formed, an optical effect added to transmitting light may be different from an optical effect in an area in which the slit 42 is not formed. However, by arranging the slit 42 at the position that overlaps the light blocking portion 11i, light is less likely to transmit through the area in which the slit 42 is formed. According to the configuration, light transmitting through the liquid crystal panel 11 is less likely to have uneven brightness and thus the display deficiencies are less likely to occur.

As described above, the liquid crystal panel (a display panel) 11 according to this embodiment includes the array substrate (a first substrate) 11b, the CF substrate (a second substrate) 11a, the sealing member 11d, the first transparent electrode film 23, the first interlayer insulating film 41, and the second transparent electrode film 24. The array substrate 11b includes the section in the display area AA and the section in the non-display area NAA that surround the display area AA. The CF substrate 11a is arranged opposite the array substrate 11b with the internal space IS therebetween. The sealing member 11d is arranged between the array substrate 11b and the CF substrate 11a in the non-display area NAA to surround the internal space IS and seals the internal space IS. The first transparent electrode film 23 is formed on the array substrate 11b at least in the display area AA. The first interlayer insulating film (the first insulting film) 41 formed in an area across a boundary between the display area AA and the non-display area NAA. The sealing member is bonded to the first interlayer insulating film 41. The first interlayer insulating film 41 is arranged closer to the array substrate 11b than the first transparent electrode film 23. The first interlayer insulating film 41 includes the slit 42 at the position closer to the display area AA than to the sealing member 11d in the non-display area NAA. The second transparent electrode film 24 is arranged closer to the array substrate 11b than to the interlayer insulating film 41 in at least the display area AA. The first interlayer insulating film 41 is sandwiched between the first transparent electrode film 23 and the second transparent electrode film 24.

The internal space IS is formed between the array substrate 11b and the CF substrate 11a that are opposed to each other. The sealing member 11d between array substrate 11b and the CF substrate 11a surrounds the internal space IS and seals the internal space IS. The first interlayer insulating film 41 is formed on the array substrate 11b in the area across the boundary between the display area AA and the non-display area NAA and sandwiched between the first transparent electrode film 23 and the second transparent electrode film 24 with the sealing member 11d bonded thereto.

If the materials of the sealing member 11d and the first interlayer insulating film 41 have different linear expansion coefficients, a stress may be applied to the portion of the first interlayer insulating film 41 to which the sealing member 11d is bonded when the temperature varies. Especially, if the frame size is reduced and the dimension between the sealing member 11d and the display area AA is reduced, the stress applied to the portion of the first interlayer insulating film. 41 to which the sealing member 11d is bonded may be more likely to affect the portion of the first interlayer insulating film 41 in the display area AA. In the configuration in which the first interlayer insulating film 41 is sandwiched between the first transparent electrode film 23 and the second transparent electrode film 24, the thickness of the first interlayer insulating film 41 tends to be smaller in comparison to a configuration that does not include the second transparent electrode film 24. Therefore, the removal of the first interlayer insulating film. 41 is more likely to occur due to the stress applied to the portion of the first interlayer insulating film 41 to which the sealing member 11d is bonded. Because the first interlayer insulating film 41 includes the slit 42 at the position closer to rather the display area AA than the sealing member 11d in the non-display area NAA, the stress that may be applied to the portion of the first interlayer insulating film 41 to which the sealing member 11d is bonded is less likely to affect the portion of the first interlayer insulating film 41 in the display area AA. According to the configuration, the portion of the first interlayer insulating film 41 in the display area AA is less likely to be removed. Therefore, the problem such as displacement of the first transparent electrode film. 23 on the first interlayer insulating film. 41 is less likely to occur. This configuration can reduce the display deficiencies and is especially preferable for reducing the frame size.

The second transparent electrode film 24 includes the electrode film extending portion 24a that extends to the non-display area NAA. The first interlayer insulating film 41 is formed such that the slit 42 overlaps the electrode film extending portion 24a of the second transparent electrode film 24. The electrode film extending portion 24a is present under the portion of the first interlayer insulating film 41 in which the slit 42 is to be formed during formation of the slit 42 in the first interlayer insulating film 41 by the photolithography method and the first interlayer insulating film 41 is partially etched. According to the configuration, the electrode film extending portion 24a functions as an etching stopper and thus etching does not proceed to a surface of the electrode film extending portion 24a closer to the array substrate 11b.

The planarization film (a second insulating film) 40 and the common potential supplying portion 29 are further included. The planarization film 40 is formed on the second transparent electrode film 24 on the array substrate 11b side in the areas of the array substrate 11b across a boundary between the display area AA and the non-display area NAA. The common potential supplying portion 29 with the common potential is disposed on the planarization film 40 on the array substrate 11b side in the non-display area NAA on the array substrate 11b. The electrode film extending portion 24a is connected to the common potential supplying portion 29 via the contact holes CH3 formed in the planarization film 40. The electrode film extending portion 24a is connected to the common potential supplying portion 29 closer to the array substrate 11b than the planarization film 40 via the contact holes CH3 formed in the planarization film 40 closer to the array substrate 11b than the second transparent electrode film 24 in the area across the boundary between the display area AA and the non-display area NAA. Therefore, the common potential is supplied to the second transparent electrode film 24 including the electrode film extending portion 24a. The electrode film extending portion 24a has the function for protecting the surface of the electrode film extending portion 24a on the array substrate 11b side from being etched in addition to the function for passing the common potential to the second transparent electrode film 24. In comparison to the configuration including the components having those functions, respectively, the configuration is simplified.

The first interlayer insulating film 41 includes the slit 42 that runs through the first interlayer insulating film 41 in the thickness direction thereof. In comparison to the configuration that includes a thin section (having a thickness smaller than that of a portion in which the slit is not formed) instead of the slit, that is, a slit that does not run through the first interlayer insulating film 41 in the thickness direction thereof, the stress that may be applied to the portion of the first interlayer insulating film 41 to which the sealing member 11d is bonded is further less likely to affect the portion of the first interlayer insulating film 41 in the display area AA. Therefore, the portion of the first interlayer insulating film 41 in the display area AA is further less likely to be removed and the display deficiencies are further less likely to occur.

The first interlayer insulating film 41 includes the slit 42 formed in a groove shape that continuously extends for the entire periphery of the sealing member 11d. With the slit 42 that continuously extends for the entire periphery of the sealing member 11d, the stress that may be applied to the portion of the first interlayer insulating film 41 to which the sealing member 11d is bonded is less likely to affect the portion of the first interlayer insulating film 41 in the display area AA. Therefore, the portion of the first interlayer insulating film 41 in the display area AA is further less likely to be removed and thus the display deficiencies are less likely to occur. Because the slit 42 continuously extends for the entire periphery of the sealing member 11d without any breaks, the stress that may be applied to the portion of the first interlayer insulating film 41 to which the sealing member 11d is bonded is less likely to affect the portion of the first interlayer insulating film 41 in the display area AA. Therefore, the portion of the first interlayer insulating film 41 in the display area AA is further less likely to be removed and thus the display deficiencies are further less likely to occur.

The light blocking portion 11i is formed on the CF substrate 11a in at least the non-display area NAA. The first interlayer insulating film 41 is arranged such that the slit 42 overlaps the light blocking portion 11i. The area of the liquid crystal panel 11 in which the slit 42 is formed and the area thereof in which the slit 42 is not formed may have differences in optical effects added to the light transmitted through the liquid crystal panel 11. This may cause the uneven brightness. Because the slit 42 of the first interlayer insulating film 41 is formed to overlap the light blocking portion 11i on the CF substrate 11a, the light is less likely to transmit through the area of the liquid crystal panel 11 in which the slit 42 is formed. According to the configuration, the light transmitting through the liquid crystal panel is less likely to have uneven brightness and thus the display deficiencies are less likely to occur.

Second Embodiment

A second embodiment of the present invention will be described with reference to FIGS. 8 to 10. The second embodiment includes slits 142 each having altered shapes in a plan view. Configurations, functions, and effects similar to those of the first embodiment will not be described.

Figure 8:
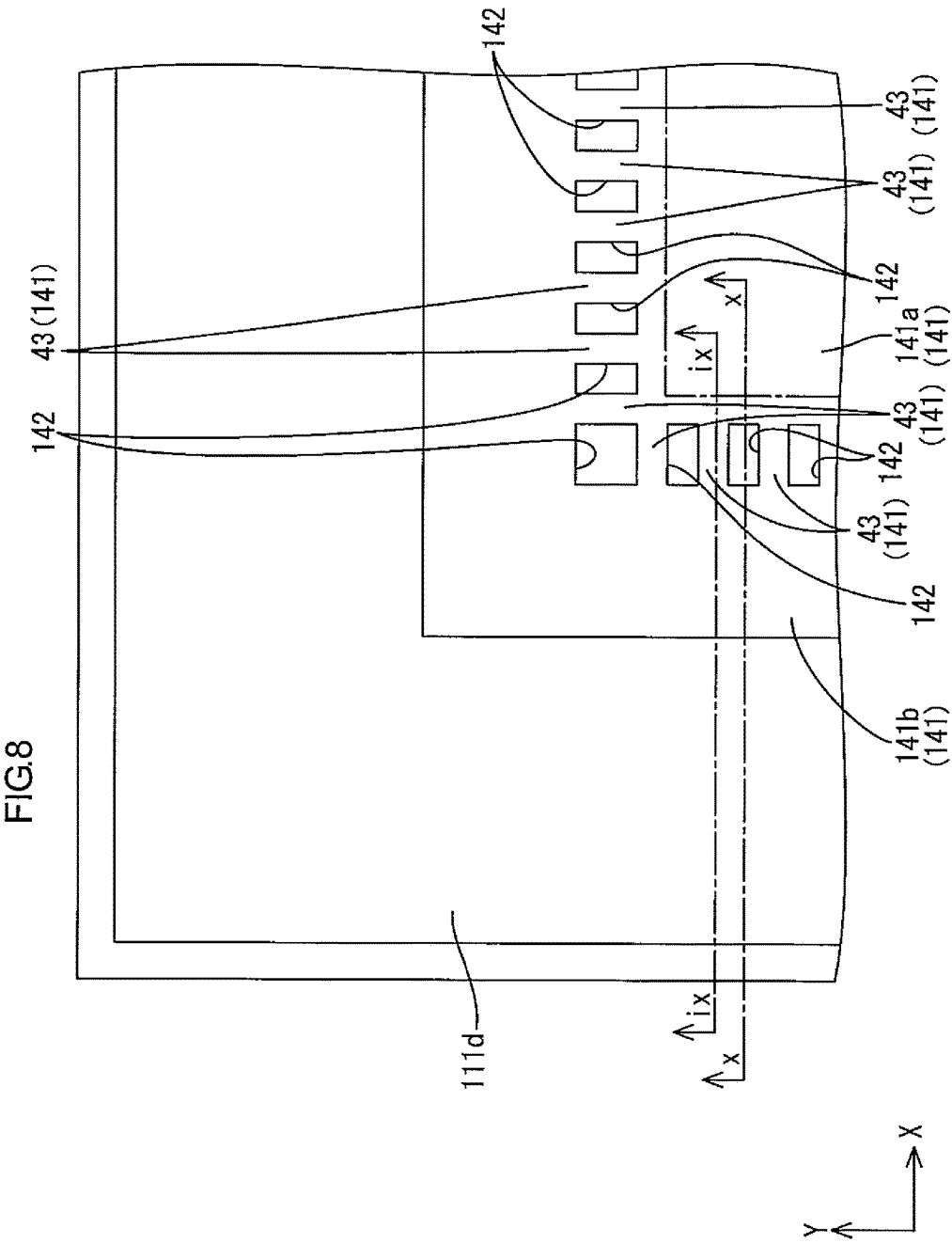
FIG. 8 is a magnified plan view illustrating a corner of an array substrate and therearound according to a second embodiment of the present invention.
Figure 9:
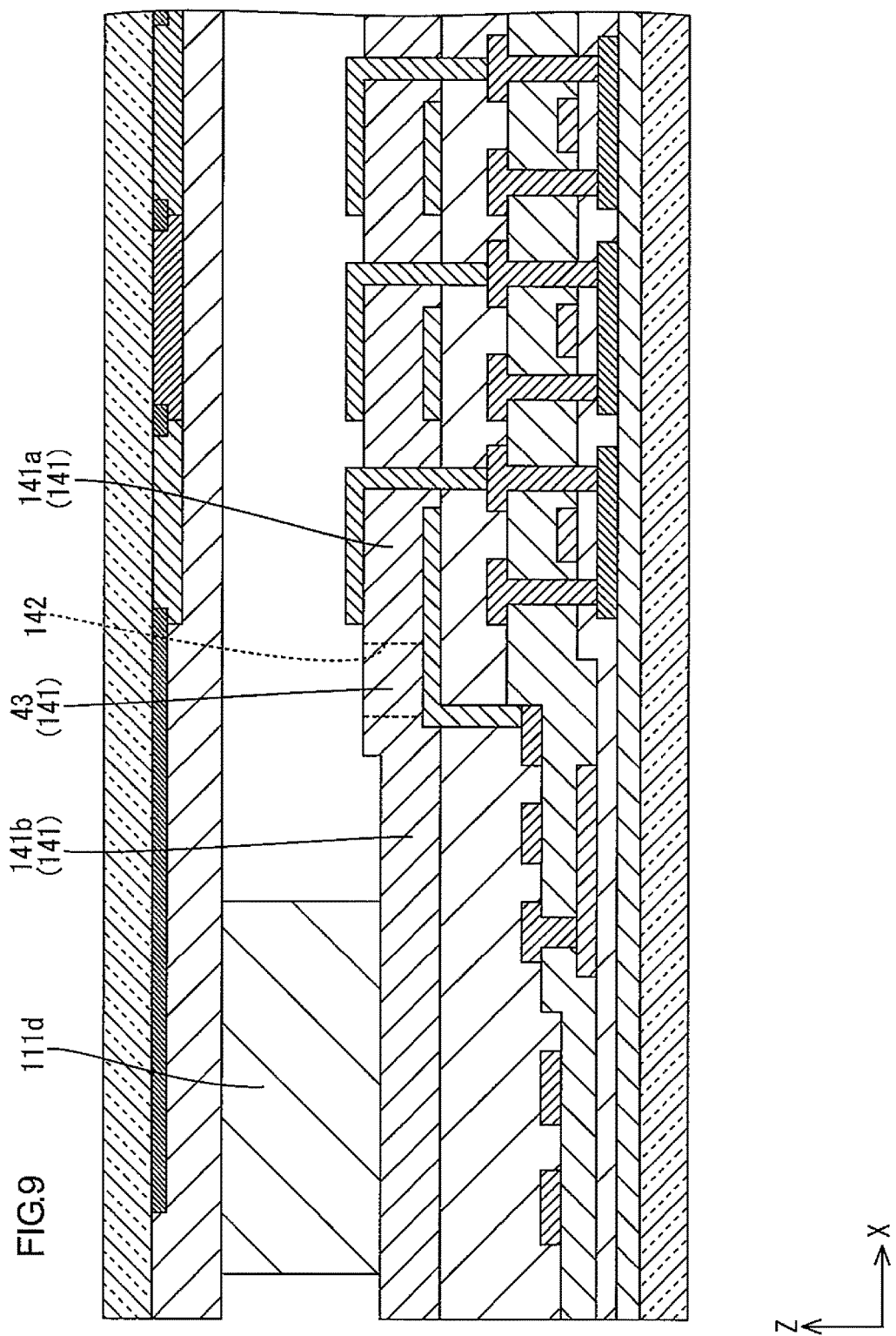
FIG. 9 is a cross-sectional view along line ix-ix in FIG. 8.
Figure 10:
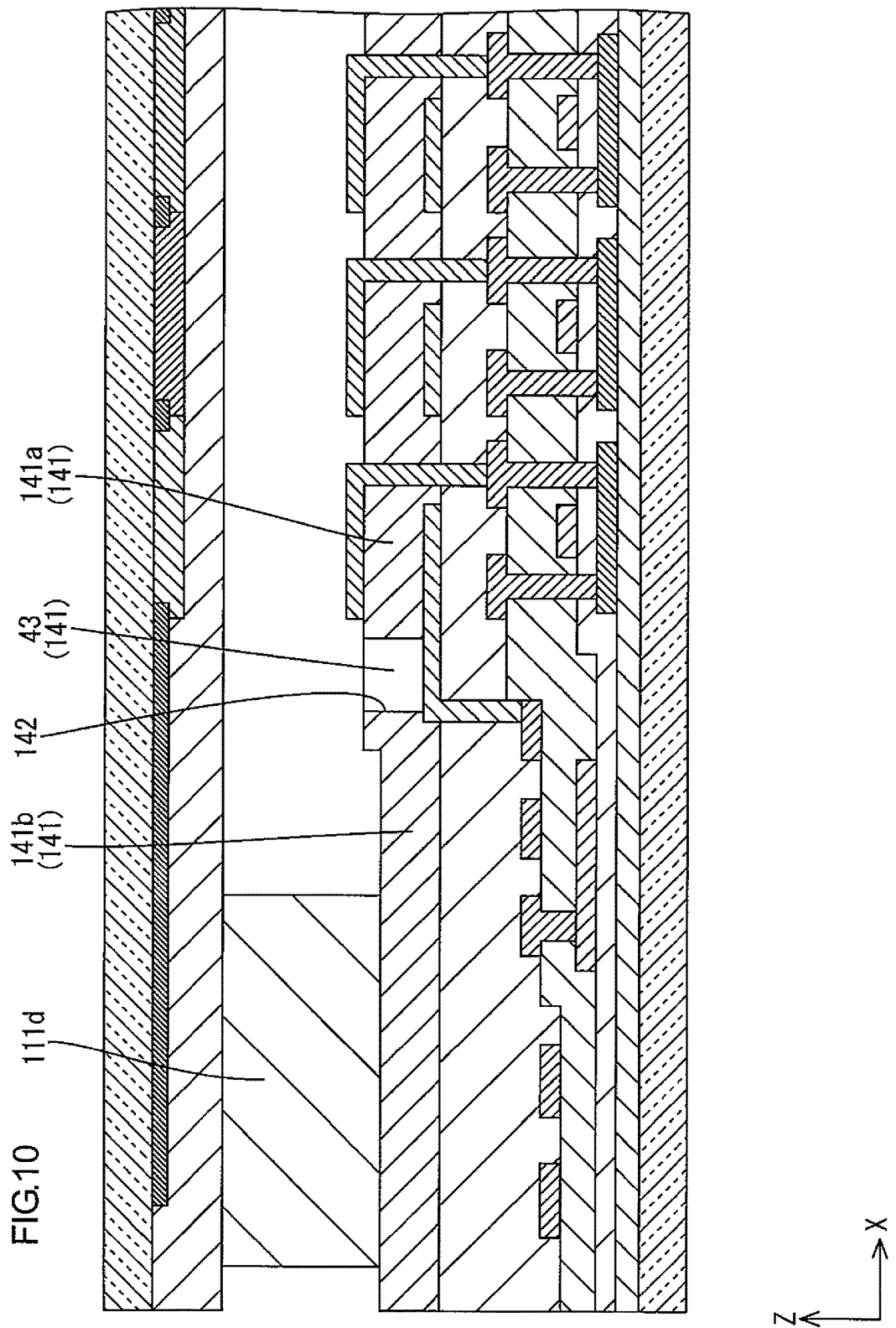
FIG. 10 is a cross-sectional view along line x-x in FIG. 8.

As illustrated in FIGS. 8 to 10, the slits 142 are arranged at intervals along a sealing member 111*d* for an entire periphery of the sealing member 111*d*. Specifically, the slits 142 are arranged at predefined intervals along the periphery of the sealing member 111*d* to form a frame shape similar to the sealing member 111*d* in a plan view. Each of the slits 142 arranged to form the frame shape has a rectangular shape in a plan view. Portions of a first interlayer insulating film 141 are present between the adjacent slits 142. The portion of the first interlayer insulating film 141 between the adjacent slits 142 are referred to as inter-slit remaining portions 43. The inter-slit remaining portions 43 are arranged at intervals along the seating member 111*d* for the entire periphery of the sealing member 111*d*. The inter-slit remaining portions 43 connect an internal portion 141*a* of the first interlayer insulating film 141 to an external portion 141*b* of the second interlayer insulating film 141. Namely, the internal portion 141*a* and the external portion 141*b* of the first interlayer insulating film 141 do not continue from each other for the entire periphery of the first interlayer insulating film 141. The internal portion 141*a* and the external portion 141*b* are connected at portions with respect to the peripheral direction via the inter-slit remaining portions 43 arranged at intervals. If a stress is applied to the external portion 141*b* of the first interlayer insulating film 141 to which the sealing member 111*d* is bonded due to variation in temperature, the stress is compensated by the inter-slit remaining portions 43 and thus the internal portion 141*a* is less likely to be removed. Specifically, the stress applied to the external portion 141*b* is reduced by a rate calculated by dividing a sum of a width of the inter-slit remaining portion 43 and a width of the slits 142 by the width of the inter-slit remaining portion 43 while the stress is transmitted to the internal portion 141*a*. Therefore, the internal portion 141*a* is less likely to be removed.

As described above, in this embodiment, the first interlayer insulating film 141 includes the slits 142 arranged at intervals for the entire periphery of the sealing member 111*d*. With the slits 142 arranged at intervals for the entire periphery of the sealing member 111*d*, the stress that may be applied to the portion of the first interlayer insulating film 141 to which the sealing member 111*d* is bonded is less likely to affect a portion of the first interlayer insulating film 141 in the display area AA. Therefore, the portion of the first interlayer insulating film 141 in the display area AA is less likely to be removed and display deficiencies are less likely to occur.

Third Embodiment

A third embodiment of the present invention will be described with reference to FIGS. 11 and 12. The third embodiment includes slits 242 each having shapes different from those of the second embodiment in a plan view. Configurations, functions, and effects similar to those of the second embodiment will not be described.

Figure 11:
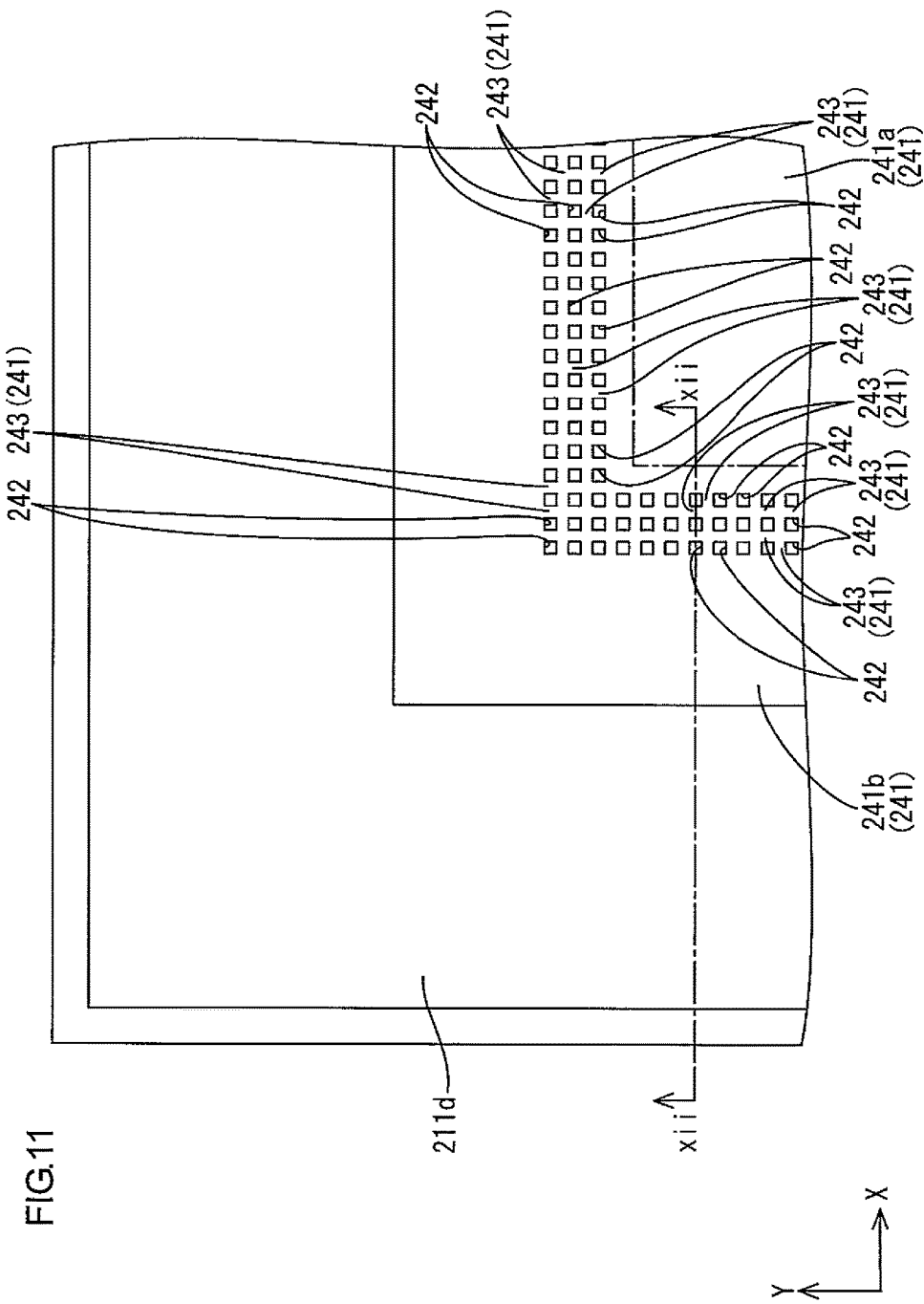
FIG. 11 is a magnified plan view illustrating a corner of an array substrate and therearound according to a third embodiment of the present invention.
Figure 12:
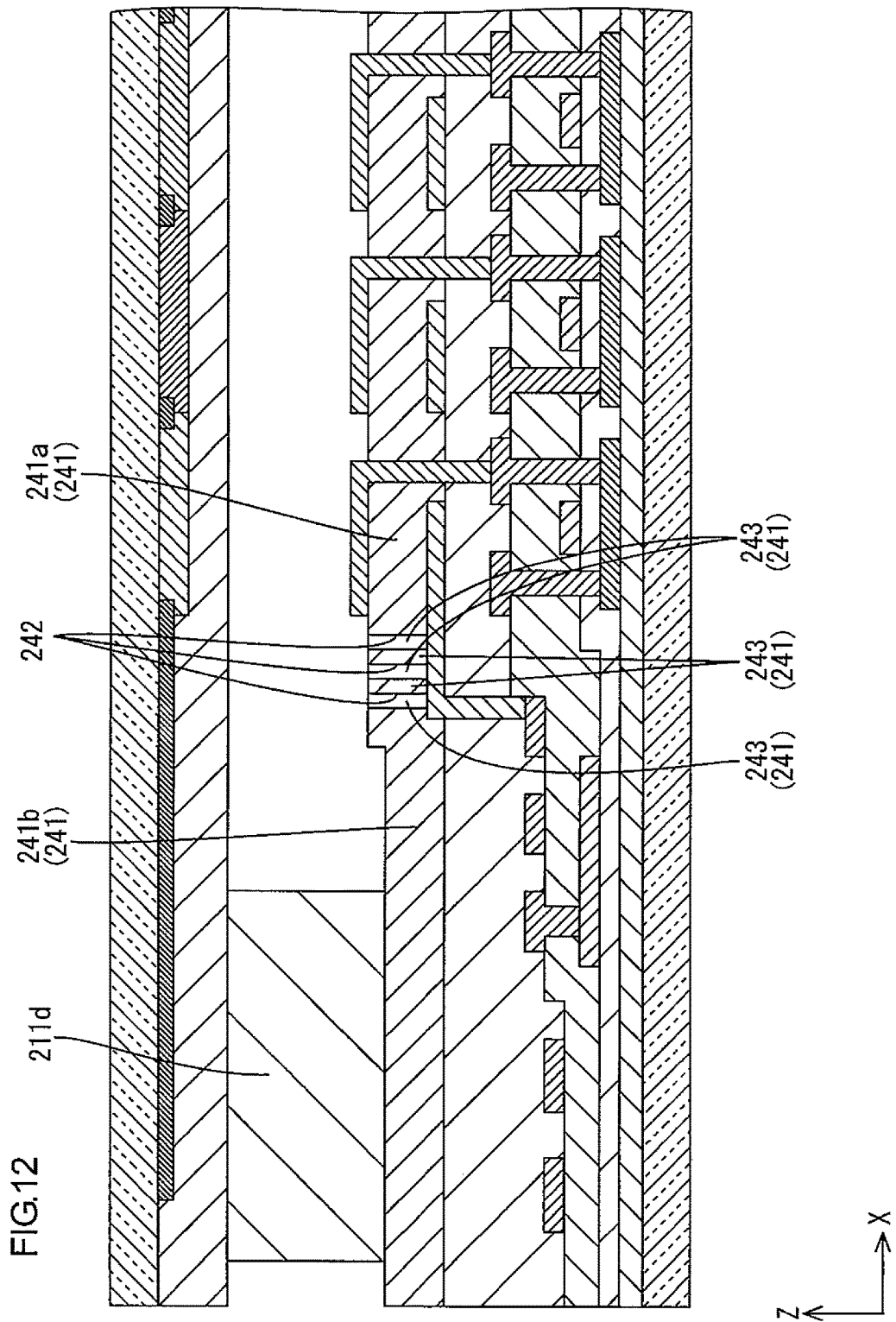
FIG. 12 is a cross-sectional view along line xii-xii in FIG. 11.

As illustrated in FIGS. 11 and 12, the slits 242 of this embodiment are arranged to form a frame shape in a plan view and at intervals in a peripheral direction and a width direction of the sealing member 211*d*. Namely, the slits 242 are arranged at intervals and in grids to form the frame shape in a plan view. The intervals among the slits 242 adjacent to one another in the peripheral direction and the width direction are smaller than those of the second embodiment. Inter-slit remaining portions 243 are arranged among the slits 242 that are adjacent to one another in the peripheral direction and the width direction. A width of each inter-slit remaining portions 243 is smaller than the width of the inter-slit remaining portion 43 of the second embodiment. The inter-slit remaining portions 243 are arranged at intervals and in grids in a plan view. The inter-slit remaining portions 243 adjacent to one another in the peripheral direction are arranged in line and the inter-slit remaining portions 243 adjacent to one another in the width direction are arranged in line. Therefore, the inter-slit remaining portions 243 form grids as a whole. According to the configuration, even if a stress is applied to an exterior portion 241*b* of the first interlayer insulating film 241 to which the sealing member 211*d* is bonded due to a variation in temperature, the stress is compensated by the inter-slit remaining portions 243 and thus an interior portion 241*a* is less likely to be removed. Specifically, the stress applied to the exterior portion 241*b* is reduced by a rate calculated by dividing a sum of a width of the inter-slit remaining portions 243 and a width of the slits 242 by the width of the inter-slit remaining portions 243 while the stress is transmitted to the internal portion 241*a*. Therefore, the internal portion 241*a* is less likely to be removed.

Fourth Embodiment

A fourth embodiment of the present invention will be described with reference to FIG. 13. The fourth embodiment includes a slit 342 having a depth different from that of the first embodiment. Configurations, functions, and effects similar to those of the first embodiment will not be described.

Figure 13:
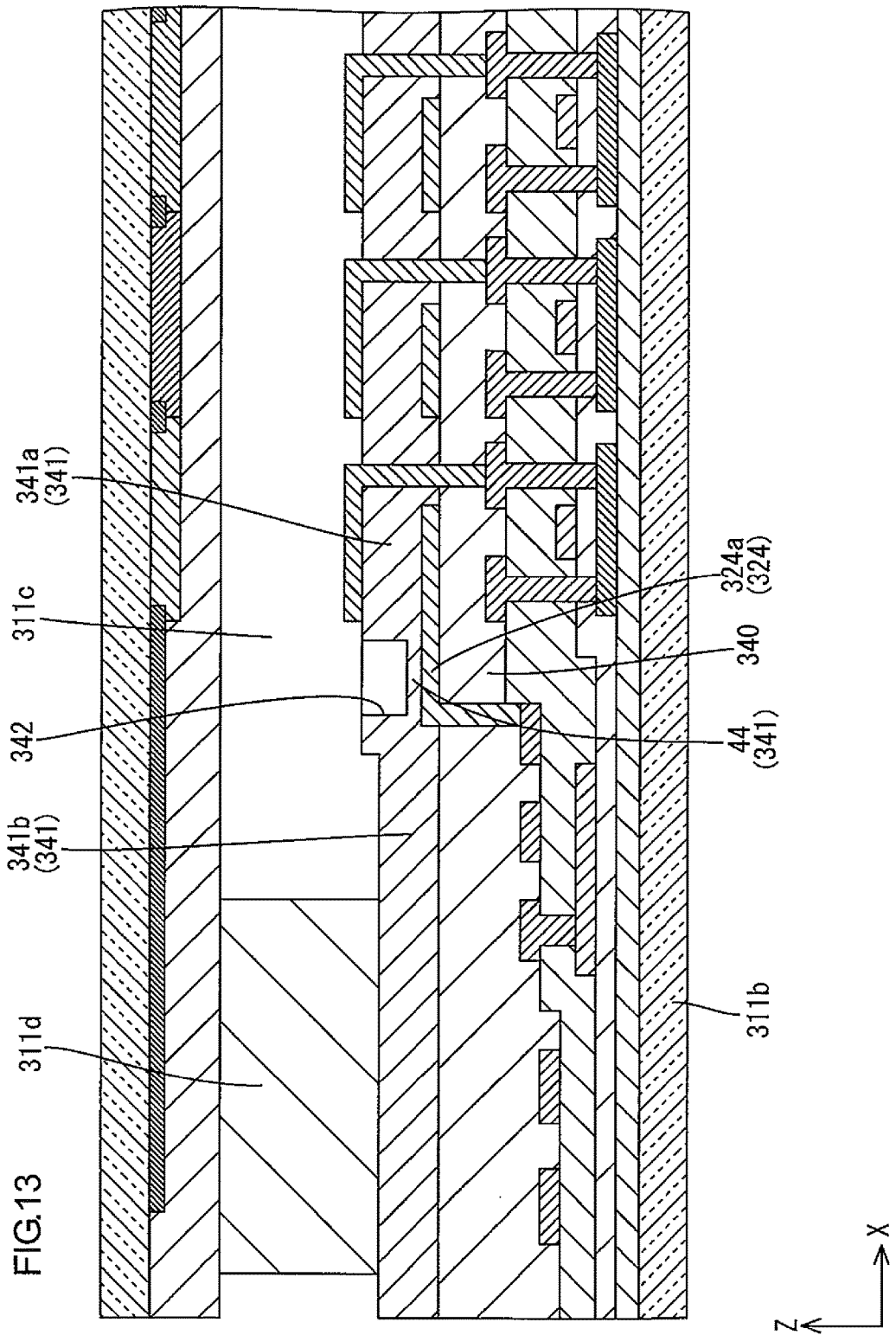
FIG. 13 is a cross-sectional view illustrating a cross-sectional configuration of an end portion of a liquid crystal panel according to a fourth embodiment of the present invention.

As illustrated in FIG. 13, the slit 342 according to this embodiment has the depth such that the slit 342 does not run through a first interlayer insulating film 341 in a thickness direction of the first interlayer insulating film 341. Namely, the depth of the slit 342 is smaller than the thickness of the first interlayer insulating film 341. A portion of the first interlayer insulating film 341 in which the slit 342 is formed include a thin portion 44 having a thickness smaller than a thickness of the portion of the first interlayer insulating film 341 in which the slit 342 is not formed. The portion of the first interlayer insulating film 341 in which the slit 342 is not formed and having the thickness larger than the thickness of the thin portion 44 include a portion of an exterior portion 341*b* overlapping a sealing member 311*d* in a plan view and an interior portion 341*a*. The slit 342 and the thin portion 44 extend continuously along the sealing member 311*d* for an entire periphery of the sealing member 311*d*. Namely, the thin portion 44 connects the interior portion 341*a* of the first interlayer insulating film 341 to the exterior portion 341*b* of the first interlayer insulating film 341 for the entire periphery. With the thin portion 44, a stress that may be applied to the exterior portion 341*b* of the first interlayer insulating film 341 to which the sealing member 311*d* is bonded due to a variation in temperature is compensated and thus the internal portion 341*a* is less likely to be removed.

To form the slit 342 according to this embodiment, a photo mask used for exposure of the first interlayer insulating film 341 in an exposing step of a production process of an array substrate 311*b* is used as a halftone mask or a gray-tone mask, which is not illustrated. The halftone mask or the gray-tone mask includes a semi-transmissive region having an exposing light transmissivity range of about 10% to 70%. In the exposing step, the portion of the first interlayer insulating film 341 in which the slit 342 and the thin portion 44 are to be formed is exposed to light transmitted through the semi-transmissive region. After the exposing step using such a halftone mask or a gray-tone mask is complete, an etching step is performed. Through these steps, the slit 342 with the thin portion is formed. In the etching step, the thin portion 44 remains in the portion in which the slit 342 is formed and a lower side of the interlayer insulating film 341 is not etched. An electrode film extending portion 324*a* of a second transparent film 324 is formed in a layer lower than the thin portion 44. Even if the slit 342 is formed with a depth to run through the first interlayer insulating film 341, the electrode film extending portion 324*a* functions as an etching stopper. Therefore, a planarization film 340 in a lower layer is less likely to be etched. According to the configuration, an evenness of the thickness of the planarization film 340 is maintained at a high level. The electrode film extending portion 324*a* in the layer lower than the first interlayer insulating film 341 is covered with the thin portion 44. Therefore, the electrode film extending portion 324*a* is less likely to be exposed to a liquid crystal layer 311*c* and thus a variation in quality of a surface facing the liquid crystal layer 311*c* is less likely to occur. According to the configuration, a reduction in display performance due to the formation of the slit 342 is less likely to occur. Even if the slit 342 is arranged so as not to overlap the electrode film extending portion 324*a*, the planarization film 340 is protected from being etched with the thin portion 44. Therefore, high flexibility in arrangement of the slit 342 is provided.

As described above, in this embodiment, the first interlayer insulating film 341 includes the thin portion 44 that is formed in the portion in which the slit 342 is formed and thinner than the portion in which the slit 342 is not formed. To form the slit 342, the first interlayer insulating film 341 may be partially etched by a photolithography method. The thin portion 44 remains in the portion of the first interlayer insulating film 341 in which the slit 342 is formed. According to the configuration, the etching is less likely to proceed to a surface of the first interlayer insulating film 341 closer to the array substrate 311*b*. In comparison to a configuration in which a slit runs through the first interlayer insulating film 341 in the thickness direction, the surface of the first interlayer insulating film 341 closer to the array substrate 311*b* is less likely to be exposed through the slit 342. Therefore, a variation in film quality is less likely to occur. According to the configuration, a reduction in display performance due to the formation of the slit 342 is less likely to occur. Furthermore, high flexibility in arrangement of the slit 342 is provided.

Fifth Embodiment

A fifth embodiment of the present invention will be described with reference to FIGS. 14 and 15. The fifth embodiment has a configuration similar to the first embodiment but the slit and the exterior portion of a first interlayer insulating film 441 are not included. Configurations, functions, and effects similar to those of the first embodiment will not be described.

Figure 14:
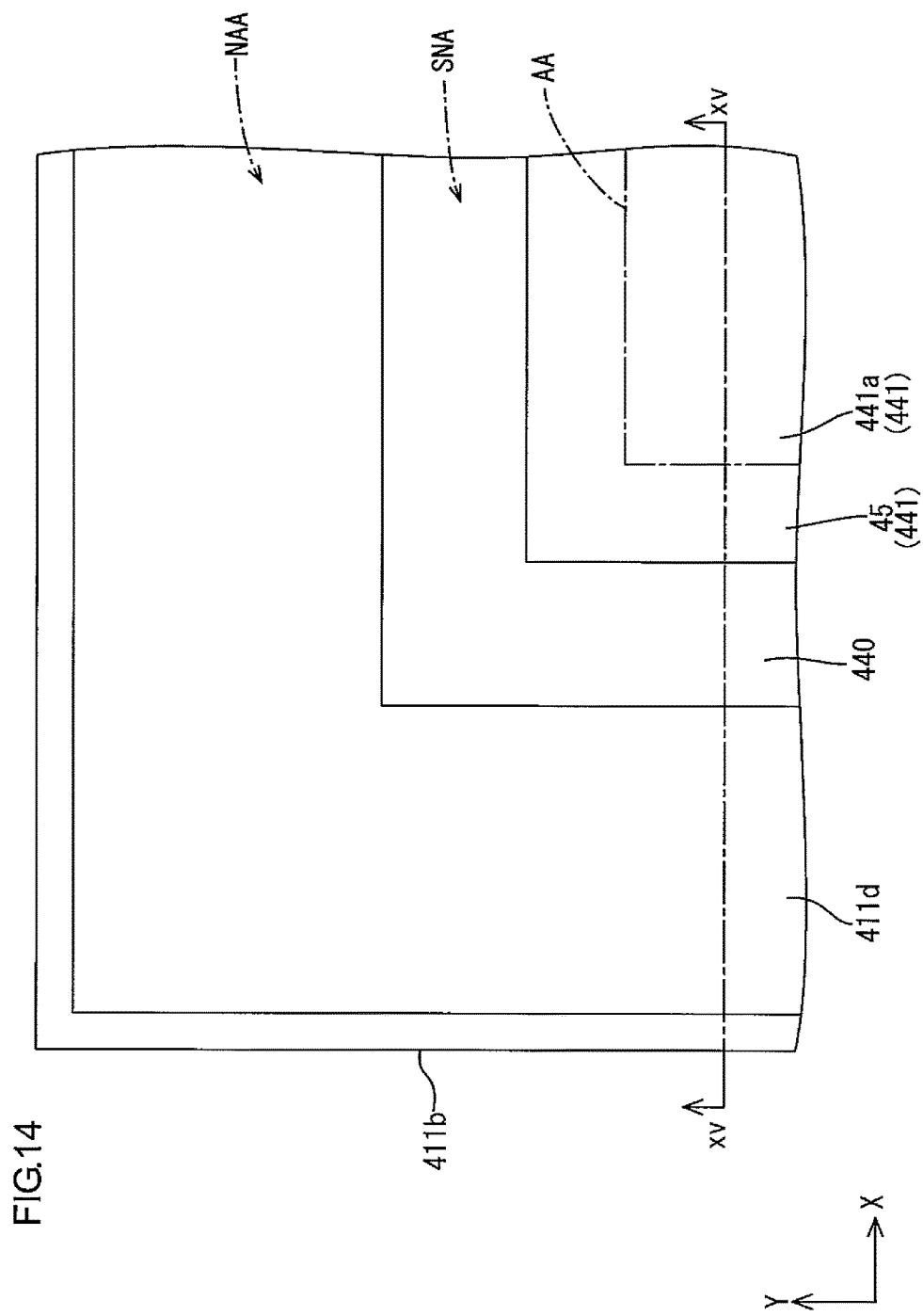
FIG. 14 is a magnified plan view illustrating a corner of an array substrate and therearound according to a fifth embodiment of the present invention.
Figure 15:
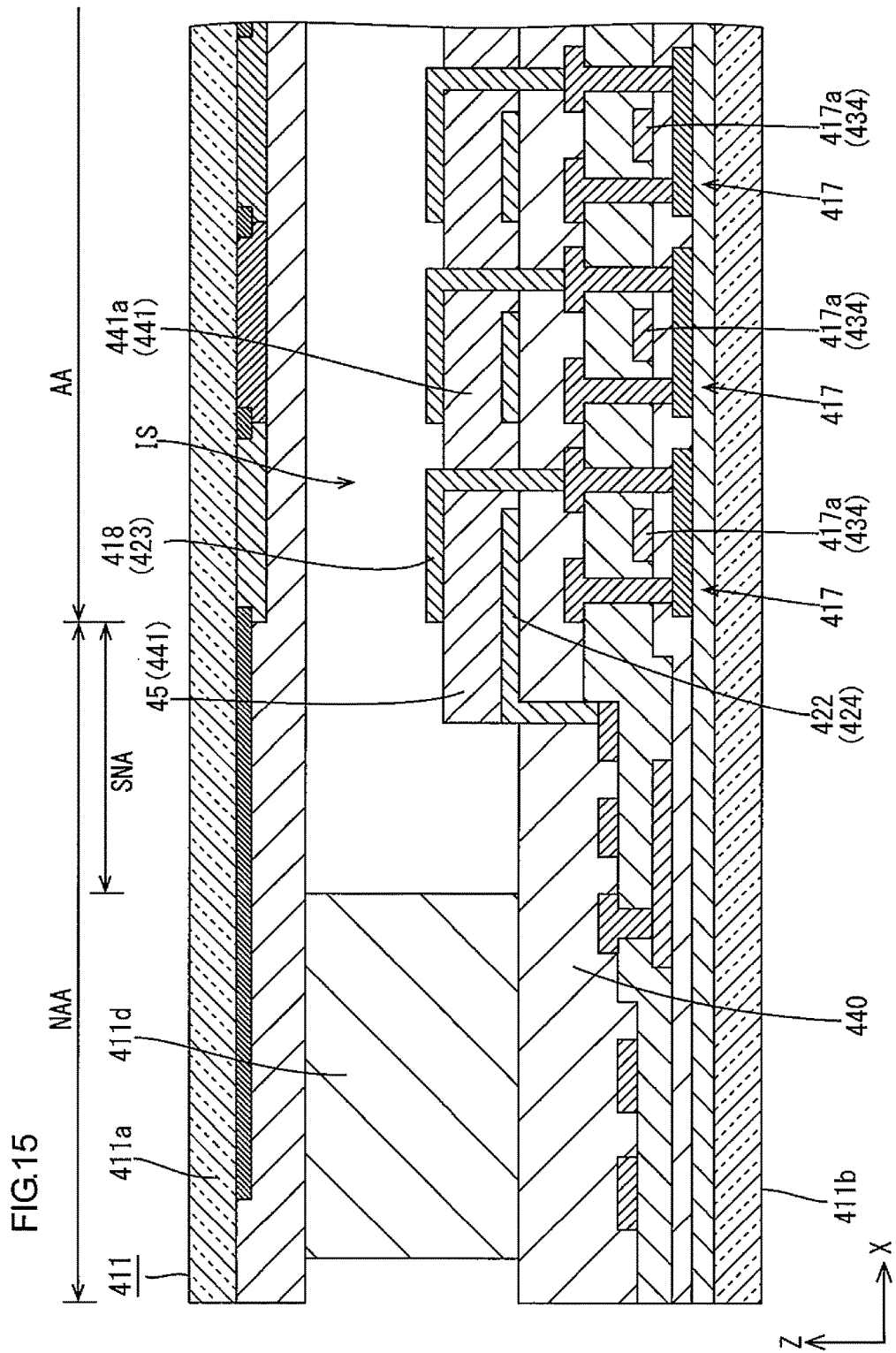
FIG. 15 is a cross-sectional view along line xv-xv in FIG. 14.

As illustrated in FIGS. 14 and 15, a first interlayer insulating film 441 according to this embodiment includes only an interior portion 441*a* arranged mainly in the display area AA. The first interlayer insulating film 441 including only the interior portion 441*a* is arranged on an array substrate 411*b* at least in the display area AA. The first interlayer insulating film 41 is arranged in a layer lower than a first transparent electrode film 423 and in an area that does not overlap a sealing member 411*d*. According to the configuration, the sealing member 411*d* is not directly bonded to the first interlayer insulating film 441 and thus a stress is less likely to be directly applied from the sealing member 411*d* to the first interlayer insulating film 441 when a variation in temperature occurs. Therefore, a portion of the first interlayer insulating film 441 in the display area AA is less likely to be removed and thus a problem such as displacement of the pixel electrodes 418 formed from a first transparent electrode film 423 arranged in a layer upper than the first interlayer insulating film 441 is less likely to occur in the display area AA. Display deficiencies are less likely to occur. This configuration is especially preferable for reducing a frame size.

Specifically, the first interlayer insulating film 441 is arranged in an area of the array substrate 411*b* in the entire display area AA and the interior portion of a sealing member non-arranged area SNA in the non-display area NAA adjacent to the display area AA. The first interlayer insulating film 441 includes an insulating film extending portion 45 that extends to the non-display area NAA in addition to an insulating film main portion in the display area AA. The insulating film extending portion 45 has a frame shape in a plan view to surround the display area AA for the enter periphery of the display area AA.

Because the first interlayer insulating film 441 is arranged in the area that does not overlap the sealing member 411*d*, the sealing member 411*d* is directly bonded to a planarization film 440 arranged in a lower layer such that a second transparent electrode film 424 (a common electrode 422) is sandwiched between the first interlayer insulating film 441 and the planarization film 440 and exposed in the portion in which the first interlayer insulating film 441 is not formed. The planarization film 440 has the thickness larger than the thickness of the first interlayer insulating film 441. Therefore, even if a stress is applied to a portion of the planarization film 440 to which the sealing member 411*d* is bonded due to a variation in temperature, a portion of the planarization film in the display area AA is less likely to be removed. Although the first interlayer insulating film 441 having the smaller thickness is more likely to be removed due to the stress, the stress due to the variation in temperature is less likely to be transmitted from the sealing member 411*d* to the first interlayer insulating film 441 because the first interlayer insulating film 441 is not directly bonded to the sealing member 411*d*. Therefore, the portion of the first interlayer insulating film 441 in the display area AA is less likely to be removed and thus display deficiencies are less likely to occur.

As described above, the liquid crystal panel (a display device) 411 of this embodiment includes the array substrate (a first substrate) 411*b*, a CF substrate (a second substrate) 411*a*, the sealing member 411*d*, the first transparent electrode film 423, the first interlayer insulating film (a first insulating film) 441, and the second transparent electrode film 424. The array substrate 411*b* includes the portion in the display area AA and the portion in the non-display area NAA that surrounds the display area AA. The CF substrate 411a is arranged to face the array substrate 411b with the internal space IS therebetween. The sealing member 411d is arranged between the array substrate 411b and the CF substrate 411a and in the non-display area NAA to surround the internal space IS and seal the internal space IS. The first transparent electrode film 423 is arranged on the array substrate 411b at least in the display area AA. The first interlayer insulating film (a first insulating film) 441 arranged on the array substrate 411b at least in the display area AA and on the first transparent electrode film 423 on the array substrate 411b side and in the area that does not overlap the sealing member 411d. The second transparent electrode film 424 is arranged on the array substrate 411b at least in the display area AA and on the first interlayer insulating film 441 closer to the array substrate 411b such that the first interlayer insulating film 441 is sandwiched between the first transparent electrode film 423 and the second transparent electrode film 424.

In this configuration, the internal space IS is provided between the array substrate 411b and the CF substrate 411a that are opposed to each other and the sealing member 411d surrounds the internal space IS and seals the internal space IS. The first interlayer insulating film 441 is arranged on the array substrate 411b at least in the display area AA and sandwiched between the first transparent electrode film 423 and the second transparent electrode film 424.

The first interlayer insulating film 441 is arranged in the portion that does not overlap the sealing member 411d and the sealing member 411d is not directly bonded to the first interlayer insulating film 441. If the sealing member is directly bonded to the first interlayer insulating film 441 and a stress is applied to a bonded portion between the sealing member and the first interlayer insulating film 441, a portion of the first interlayer insulating film 441 in the display area AA may be removed. As a result, a problem such as displacement of the first transparent electrode film 423 arranged in the layer upper than the first interlayer insulating film 441 may occur. Especially, if the frame size is further reduced and a dimension between the sealing member 411d and the display area AA is further reduced, the stress applied to the bonded portion is more likely to affect the portion of the first interlayer insulating film 441 in the display area AA. Furthermore, in comparison to a configuration that does not include the second transparent electrode film 424, the thickness of the first interlayer insulating film 441 sandwiched between the first transparent electrode film 423 and the second transparent electrode film 424 tends to be smaller. Therefore, the first interlayer insulating film 441 is more likely to be removed due to the stress applied to the portion of the first interlayer insulating film 441 to which the sealing member 411d is bonded. Because the first interlayer insulating film 441 is not directly bonded to the sealing member 411d, the stress due to the variation in temperature is less likely to be transmitted from the sealing member 411d to the first interlayer insulating film 441. According to the configuration, the portion of the first interlayer insulating film 441 in the display area AA is less likely to be removed and thus the problem such as the displacement of the first transparent electrode film 23 arranged above the first interlayer insulating film 441 is less likely to occur. Therefore, the display deficiencies are less likely to occur. This configuration is especially preferable for reducing the frame size.

Furthermore, the second transparent electrode film. 424 and the planarization film 440 are formed on the array substrate 411b. The second transparent electrode film. 424 is arranged closer to the array substrate 411b than the first interlayer insulating film 441. The first interlayer insulating film 441 is sandwiched between the first transparent electrode film 423 and the second transparent electrode film 424. The planarization film 440 is arranged in the area of the array substrate 411b across a boundary between the display area AA and the non-display area NAA. The sealing member 411d is bonded to the planarization film 440. The planarization film 440 is arranged closer to the array substrate 411b than the second transparent electrode film 424. The planarization film 440 has the thickness larger than the thickness of the first interlayer insulating film 441. In the configuration in which the first interlayer insulating film 441 is sandwiched between the first transparent electrode film 423 and the second transparent electrode film 424, the thickness of the planarization film 440 to which the sealing member 411d is bonded is larger than the thickness of the first interlayer insulating film 441. Therefore, even if a stress is applied to the portion of the planarization film 440 to which the sealing member 411d is bonded, the portion of the planarization film 440 in the display area AA is less likely to be removed. Namely, the first interlayer insulating film 441 having the smaller thickness tends to be removed due to the stress; however, the stress caused by the variation in temperature is less likely to be transmitted from the sealing member 411d to the first interlayer insulating film 441 because the first interlayer insulating film 441 is not directly bonded to the sealing member 411d. Therefore, the portion of the first interlayer insulating film 441 in the display area AA is less likely to be removed and thus display deficiencies are less likely to occur.

Sixth Embodiment

A sixth embodiment of the present invention will be described with reference to FIG. 16. The sixth embodiment includes a slit 542 and a thin portion 544 that are arranged differently from those of the fourth embodiment. Configurations, functions, and effects similar to those of the fourth embodiment will not be described.

Figure 16:
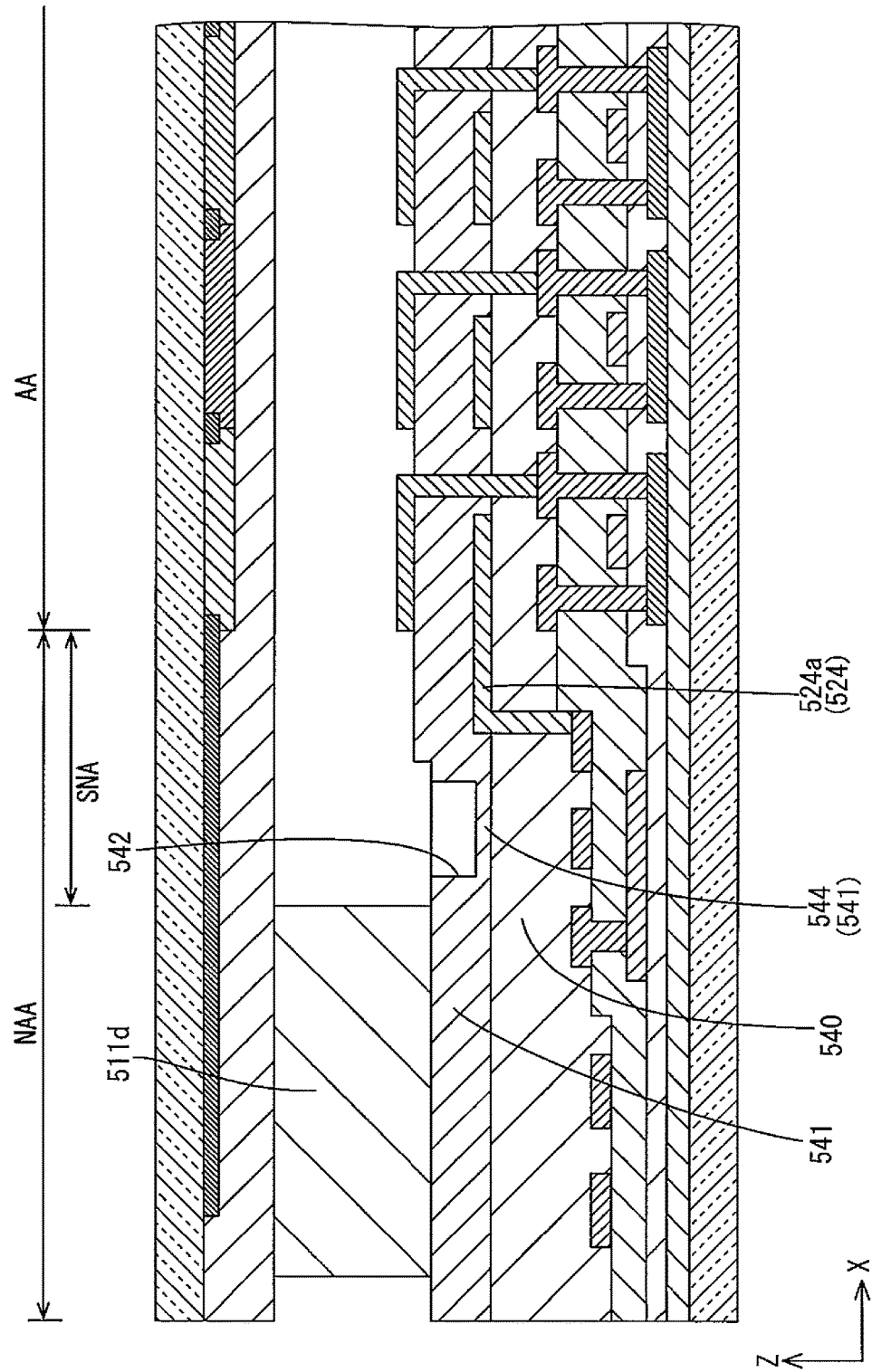
FIG. 16 is a cross-sectional view illustrating a cross-sectional configuration of an end portion of a liquid crystal panel according to a sixth embodiment of the present invention.

As illustrated in FIG. 16, the slit 542 and the thin portion 544 according to this embodiment is formed in a portion of a sealing member non-arranged area SNA in the non-display area NAA not to overlap an electrode film extending portion 524a of a second transparent electrode film 524 in a plan view. Although the slit 542 is formed so as not to overlap the electrode film extending portion 524a, the slit 542 does not run through the first interlayer insulating film 541 in the thickness direction. The remaining thin portion 544 protects a planarization film 540 in a lower layer from being etched during formation of the slit 542. With the slit 542 formed in the first interlayer insulating film 541 with the thin portion 544 that remains, etching of the planarization film 540 is properly reduced while flexibility in arrangement of the slit 542 is achieved without considering a location of the electrode film extending portion 524a. High flexibility is provided in arrangement of the slit 542 and thus the slit 542 and the thin portion 544 can have widths larger than those in the fourth embodiment.

Specifically, the slit 542 and the thin portion 544 are arranged in a portion of the sealing member non-arranged area SNA sandwiched between a sealing member 511d and the electrode film extending portion 524a. The slit 542 and the thin portion 544 are arranged such that a distance to the sealing member 511d is smaller than a distance to the display area AA, that is, closer to the sealing member 511d than to the display area AA. In comparison to the slit 342 in the fourth embodiment, the slit 542 and the thin portion 544 according to this embodiment are arranged closer to a portion of the first interlayer insulating film 541 to which the sealing member 511d is bonded. Even if a stress is applied to the portion of the first interlayer insulating film 541 to which the sealing member 511d is bonded and the portion is removed, a removal area of the portion is small because of the position of the slit 542. Therefore, even if the removal of the first interlayer insulating film 541 occurs, the removal is less likely to affect display performances because the removal area is limited.

As described above, in this embodiment, the slit 542 in the first interlayer insulating film 541 is arranged closer to the sealing member 511d than to the display area AA. According to the configuration in which the thin portion is formed in the portion of the first interlayer insulating film 541 in which the slit 542 is formed, high flexibility in arrangement of the slit 542 is provided. Therefore, the slit 542 can be arranged closer to the sealing member 511d than to the display area AA. Even if a stress is applied to the portion of the first interlayer insulating film 541 to which the sealing member 511d is bonded and the removal of the portion occurs, the removal area of the first interlayer insulating film 541 is small because of the position of the slit 542. Therefore, even if the removal of the first interlayer insulating film 541 occurs, the removal is less likely to affect the display performances because the removal is limited.

Seventh Embodiment

A seventh embodiment of the present invention will be described with reference to FIG. 17. The seventh embodiment includes a slit 642 having a depth different from that of the sixth embodiment and excludes the thin portion. Configurations, functions, and effects similar to those of the sixth embodiment will not be described.

Figure 17:
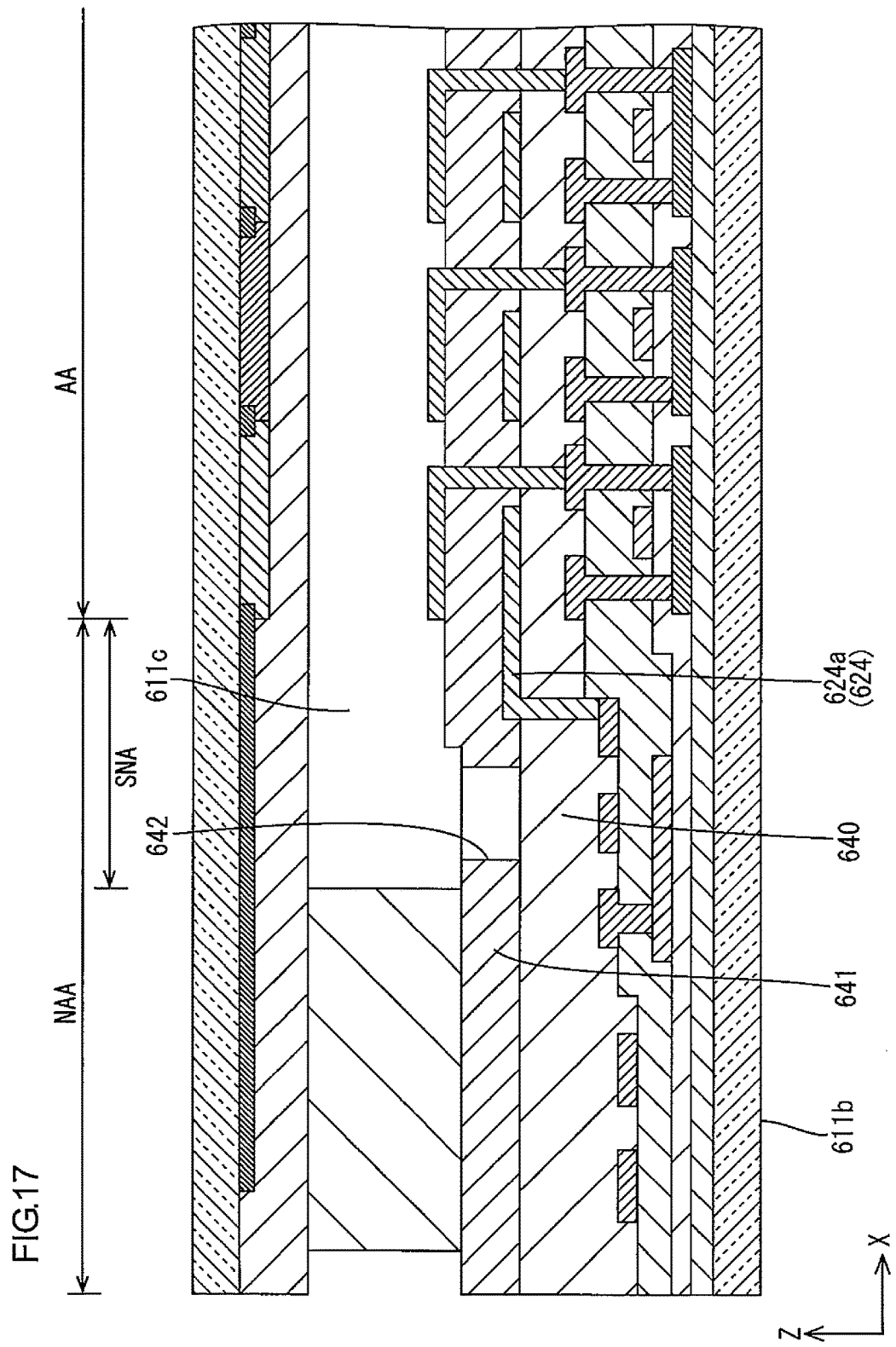
FIG. 17 is a cross-sectional view illustrating a cross-sectional configuration of an end portion of a liquid crystal panel according to a seventh embodiment of the present invention.

As illustrated in FIG. 17, the slit 642 according to this embodiment is formed in a sealing member non-arranged area SNA in the non-display area NAA at a position that does not overlap an electrode film extending portion 624a of a second transparent electrode film 624 in a plan view. The slit 642 runs through the first interlayer insulating film 641 in the thickness direction. Therefore, a planarization film 640 in a lower layer is exposed to a liquid crystal layer 611c through the slit 642. The slit 642 is arranged closer to the sealing member 611d than to the display area AA. The slit 642 formed in the first interlayer insulating film 641 without the thin portion can be arranged without considering the location of the electrode film extending portion 624a.

As described above, this embodiment includes the planarization film 640 arranged in the area of the array substrate 611b across the display area AA and the non-display area NAA and on the first interlayer insulating film 641 on the array substrate 611b side. The first interlayer insulating film 641 is arranged such that the slit 642 overlaps the planarization film 640. According to the configuration, high flexibility in arrangement of the slit 642 is provided.

Eighth Embodiment

An eighth embodiment of the present invention will be described with reference to FIGS. 18 and 19. The eighth embodiment includes the different number of slits 742 from the first embodiment. Configurations, functions, and effects similar to those of the first embodiment will not be described.

Figure 18:
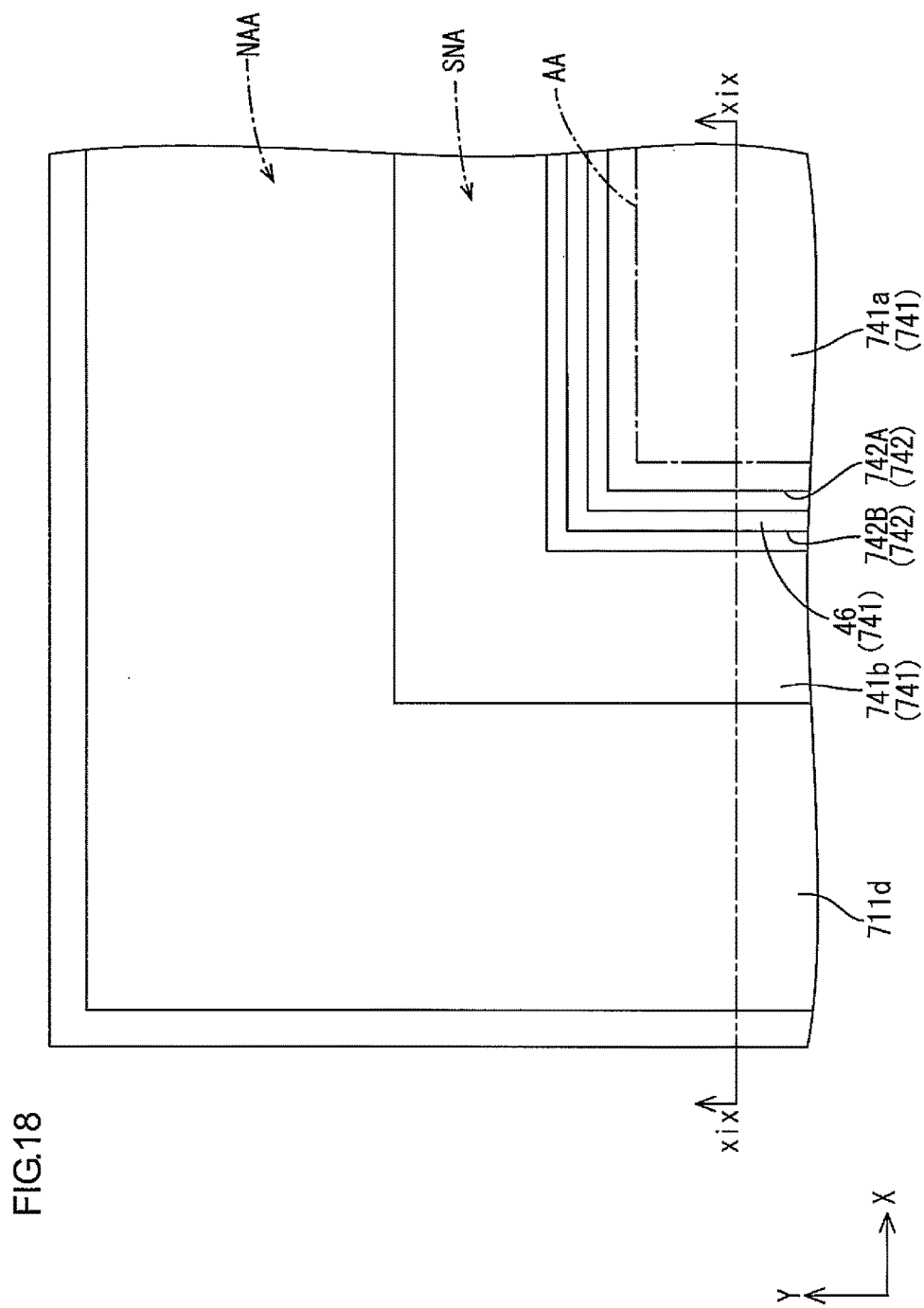
FIG. 18 is a magnified plan view illustrating a corner of an array substrate and therearound according to an eighth embodiment of the present invention.
Figure 19:
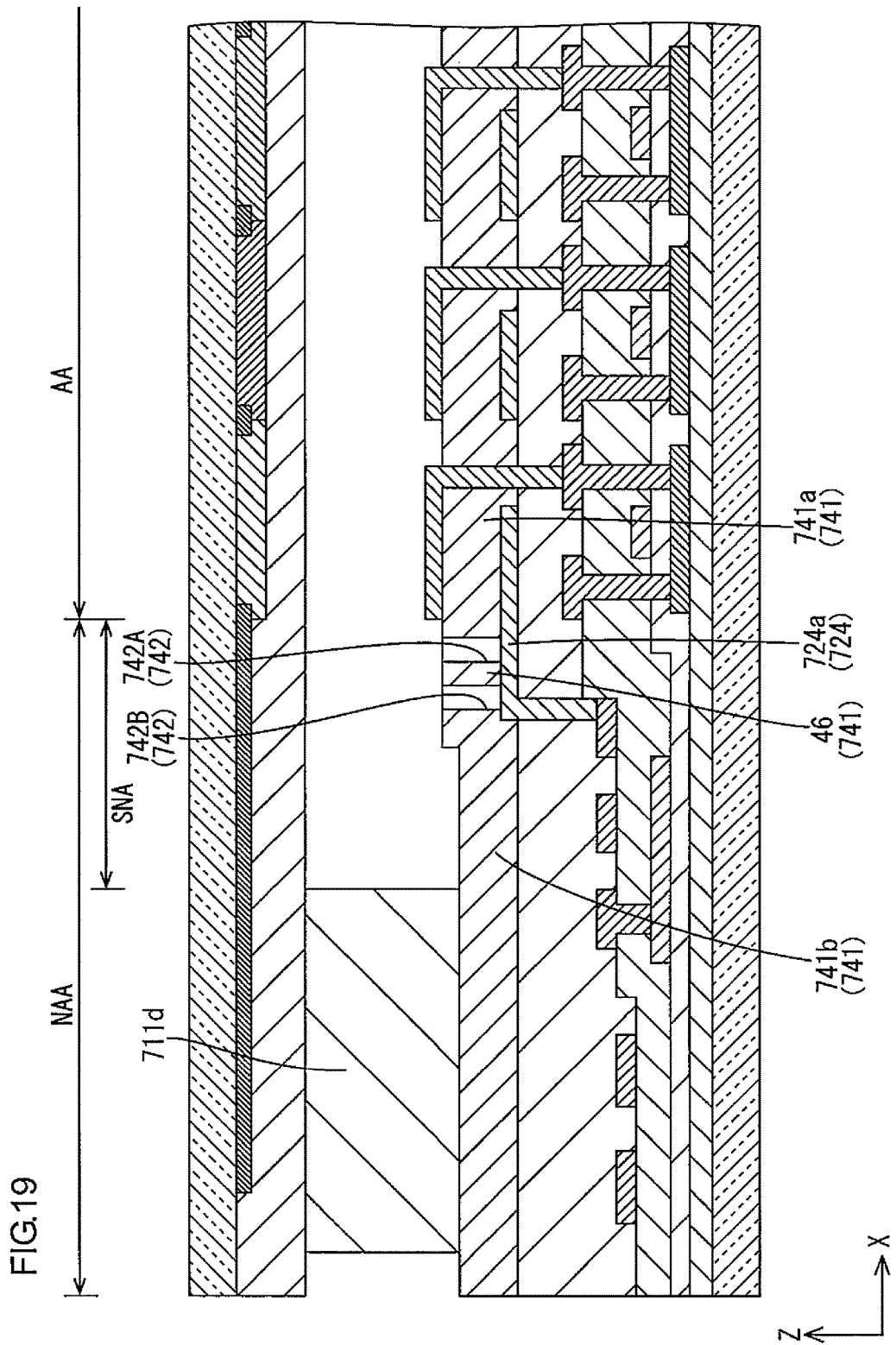
FIG. 19 is a cross-sectional view along line xix-xix in FIG. 18.

As illustrated in FIGS. 18 and 19, this embodiment includes two slits 742 parallel to each other in the sealing member non-arranged area SNA in the non-display area NAA. Two slits 743 continuously extend along a sealing member 711d for an entire periphery of the sealing member 711d. Two slits 742 includes an inner slit 742A and an outer slit 742B. The inner slit 742A is arranged closer to the display area AA. The outer slit 742B is arranged closer to the sealing member 711d. The inner slit 742A and the outer slit 742B are arranged to overlap an electrode film extending portion 724a of a second transparent electrode film 724 in a plan view. A first interlayer insulating film 741 includes an interior portion 741a, an exterior portion 741b, and an intermediate portion 46. The interior portion 741a is arranged inner than the inner slit 742A. The exterior portion 741b is arranged outer than the outer slit 742B. The intermediate portion 46 is sandwiched between the slits 742A and 742B. The intermediate portion 46 has a frame shape along the slits 742A and 742B in a plan view.

Ninth Embodiment

A ninth embodiment of the present embodiment will be described with reference to FIGS. 20 and 21. The ninth embodiment has a configuration that is a combination of the second and the fourth embodiments. Configurations, functions, and effects similar to those of the second and the fourth embodiments will not be described.

Figure 20:
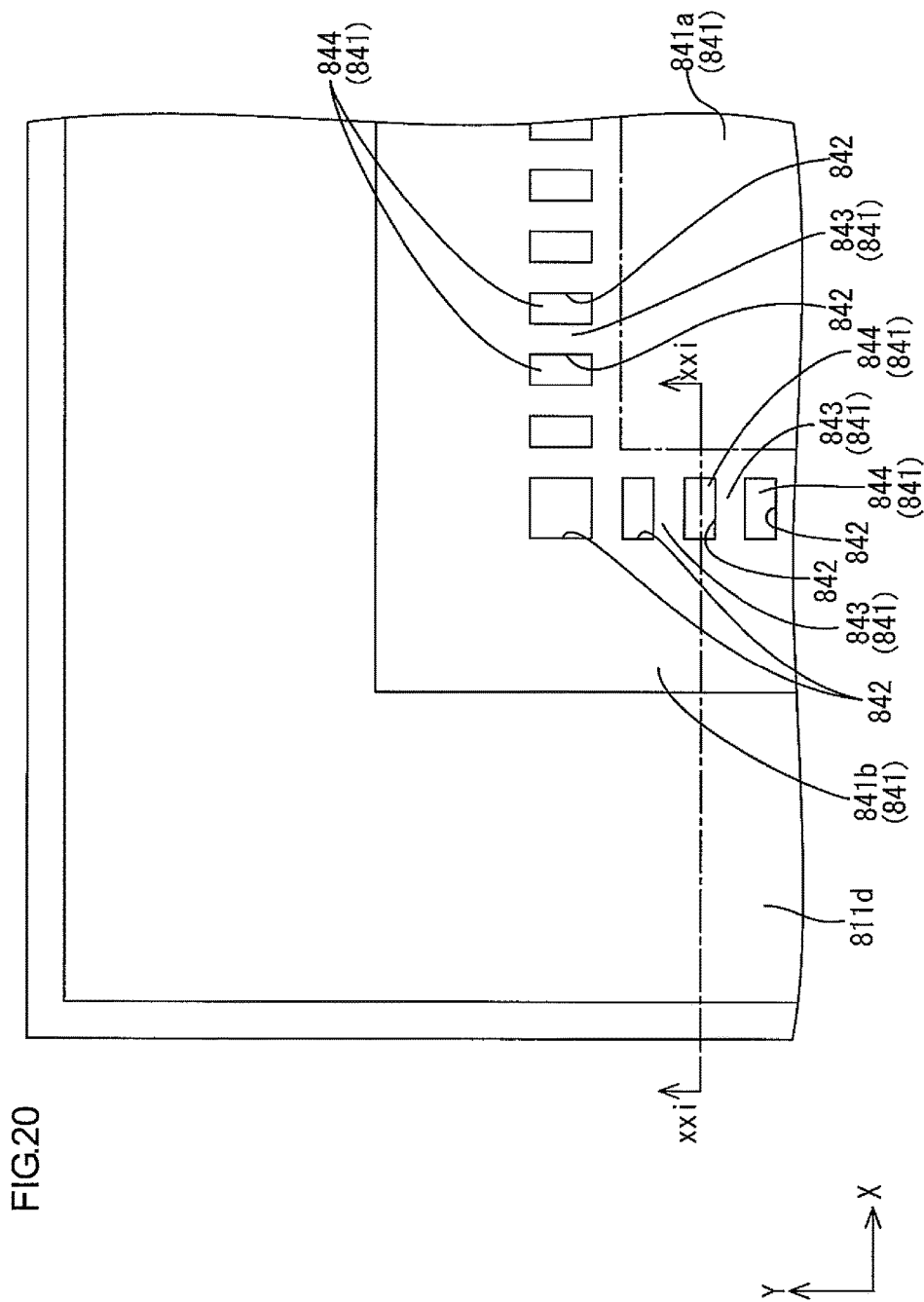
FIG. 20 is a magnified plan view illustrating a corner of an array substrate and therearound according to a ninth embodiment of the present invention.
Figure 21:
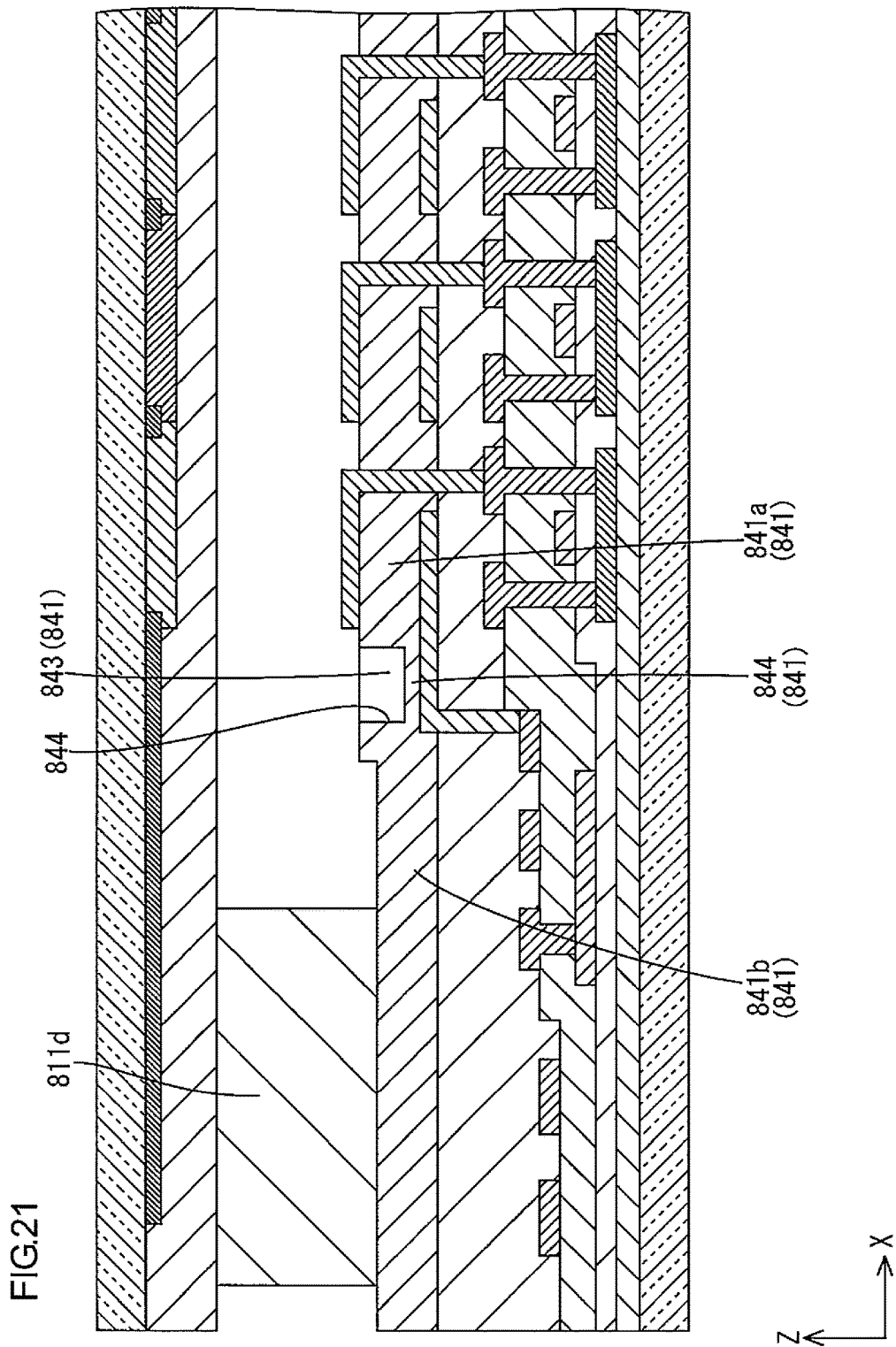
FIG. 21 is a cross-sectional view along line xxi-xxi in FIG. 20.

As illustrated in FIGS. 20 and 21, slits 842 are arranged at intervals along a sealing member 811d for an entire periphery of the sealing member 811d. Each of the slits 842 has a depth such that the slit 842 does not run through a first interlayer insulating film 841 in a thickness direction of the first interlayer insulating film 841. Inter-slit remaining portions 843 are formed between the adjacent slits 842. The inter-slit remaining portions 843 connect inner peripheral portions 841a of the interlayer insulating film 841 to outer peripheral portions 841b of the interlayer insulating film 841. Portions of the interlayer insulating film 841 in which the slits 842 are formed include thin portions 8444 each having a thickness smaller than a thickness of other portions of the interlayer insulating film 841 in which the slits 842 are not formed.

Tenth Embodiment

A tenth embodiment of the present embodiment will be described with reference to FIGS. 22 and 23. The tenth embodiment has a configuration that is a combination of the third and the fourth embodiments. Configurations, functions, and effects similar to those of the third and the fourth embodiments will not be described.

Figure 22:
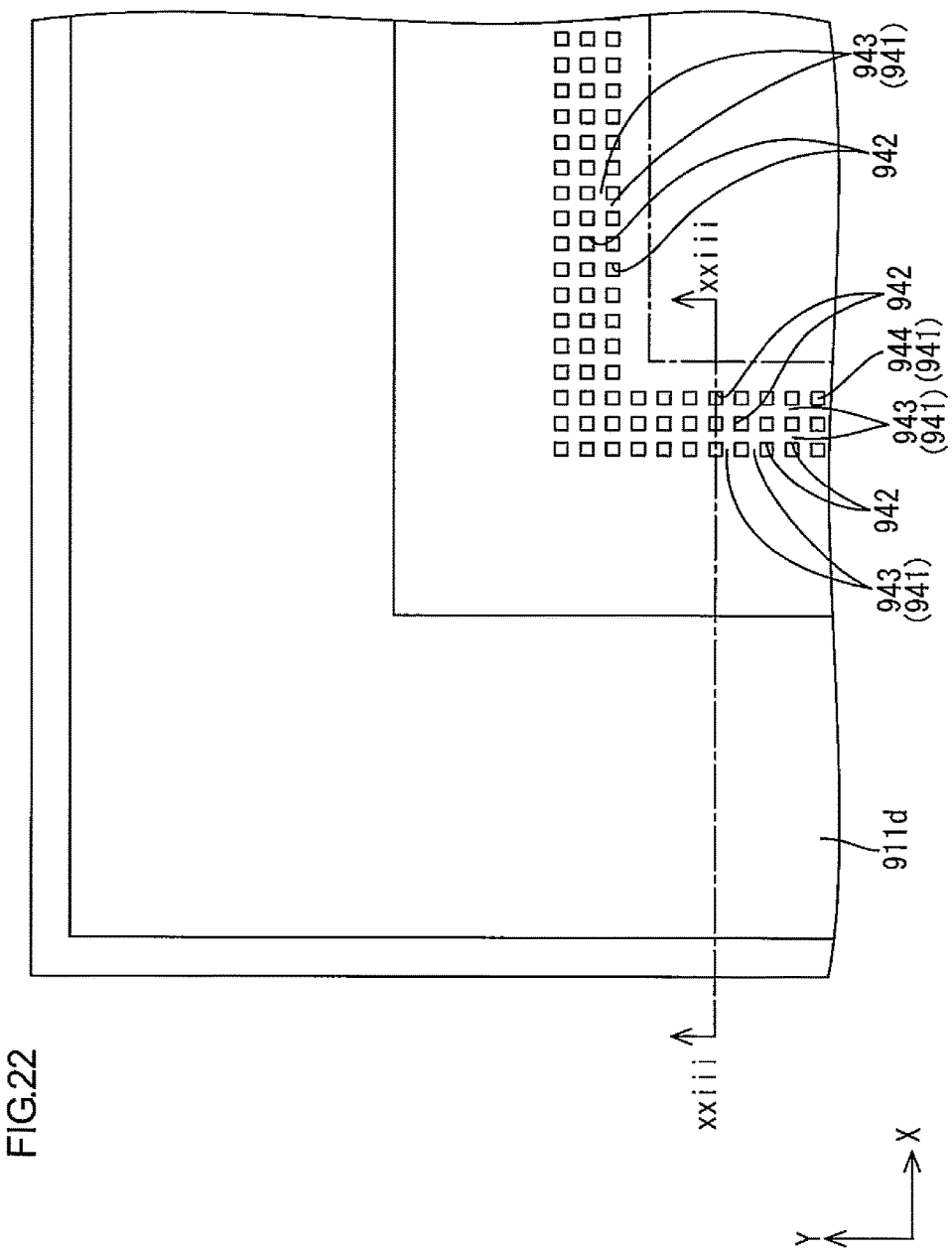
FIG. 22 is a magnified plan view illustrating a corner of an array substrate and therearound according to a tenth embodiment of the present invention.
Figure 23:
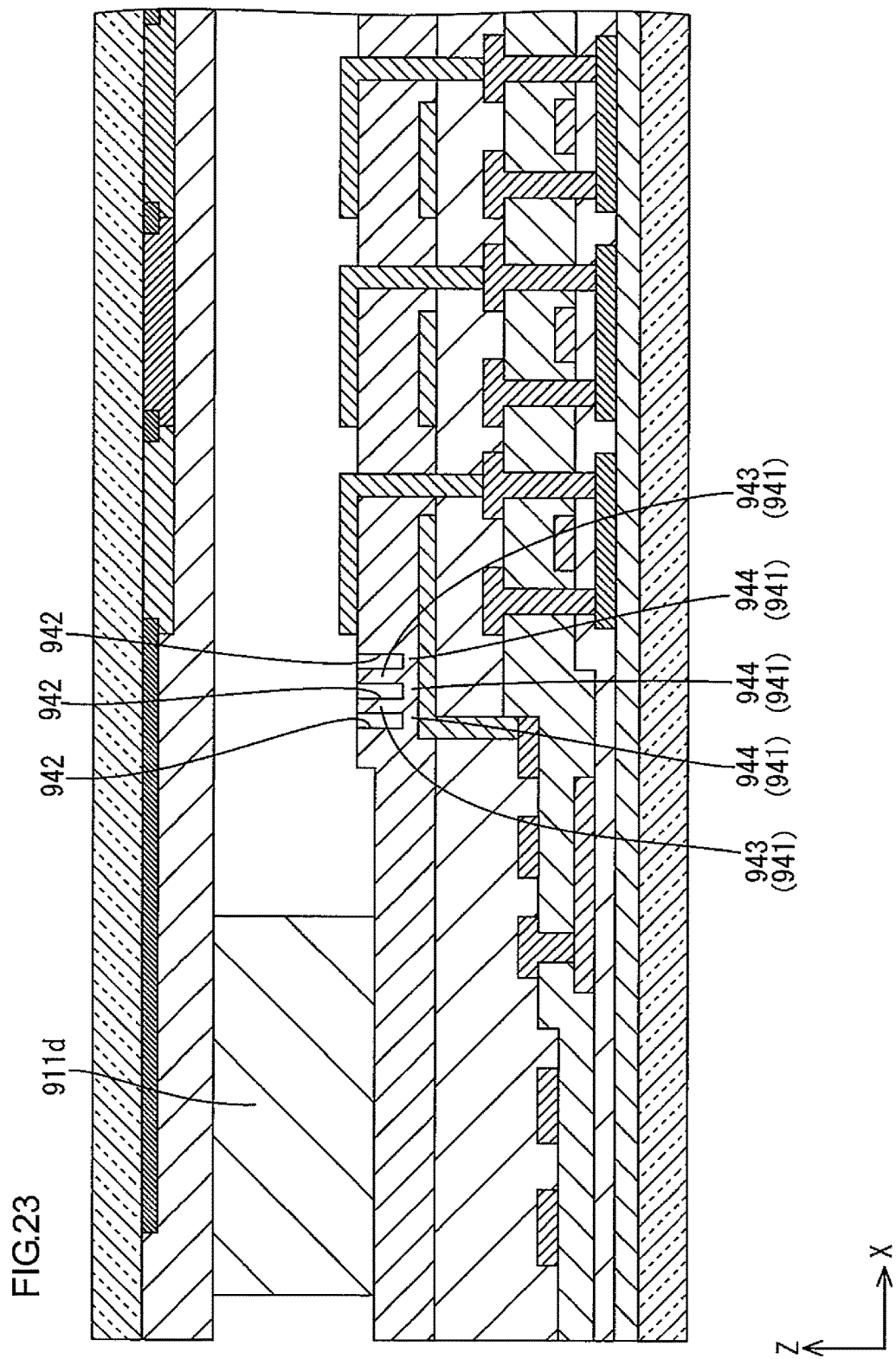
FIG. 23 is a cross-sectional view along line xxiii-xxiii in FIG. 22.

As illustrated in FIGS. 22 and 23, slits 942 have frame shapes along a sealing member 911d in a plan view. The slits 942 are arranged at intervals in a peripheral direction and a width direction. The slits 942 are formed in a first interlayer insulating film 941 with a depth such that the slits 942 do not run through the first interlayer insulating film 941 in a thickness direction of the first interlayer insulating film 941. Inter-slit remaining portions 943 arranged in a grid as a whole are provided between adjacent slits 942. Portions of the first interlayer insulating film 941 in which the slits 942 are formed include thin portions 944 having a thickness smaller than the thickness of the first interlayer insulating film 941 in which the slits 942 are not formed.

Eleventh Embodiment

An eleventh embodiment of the present invention will be described with reference to FIG. 24. The eleventh embodiment includes a slit 1042 arranged differently from the first embodiment and a second electrode film extending portion 47 that overlaps the slit 1042. Configurations, functions, and effects similar to those of the first embodiment will not be described.

Figure 24:
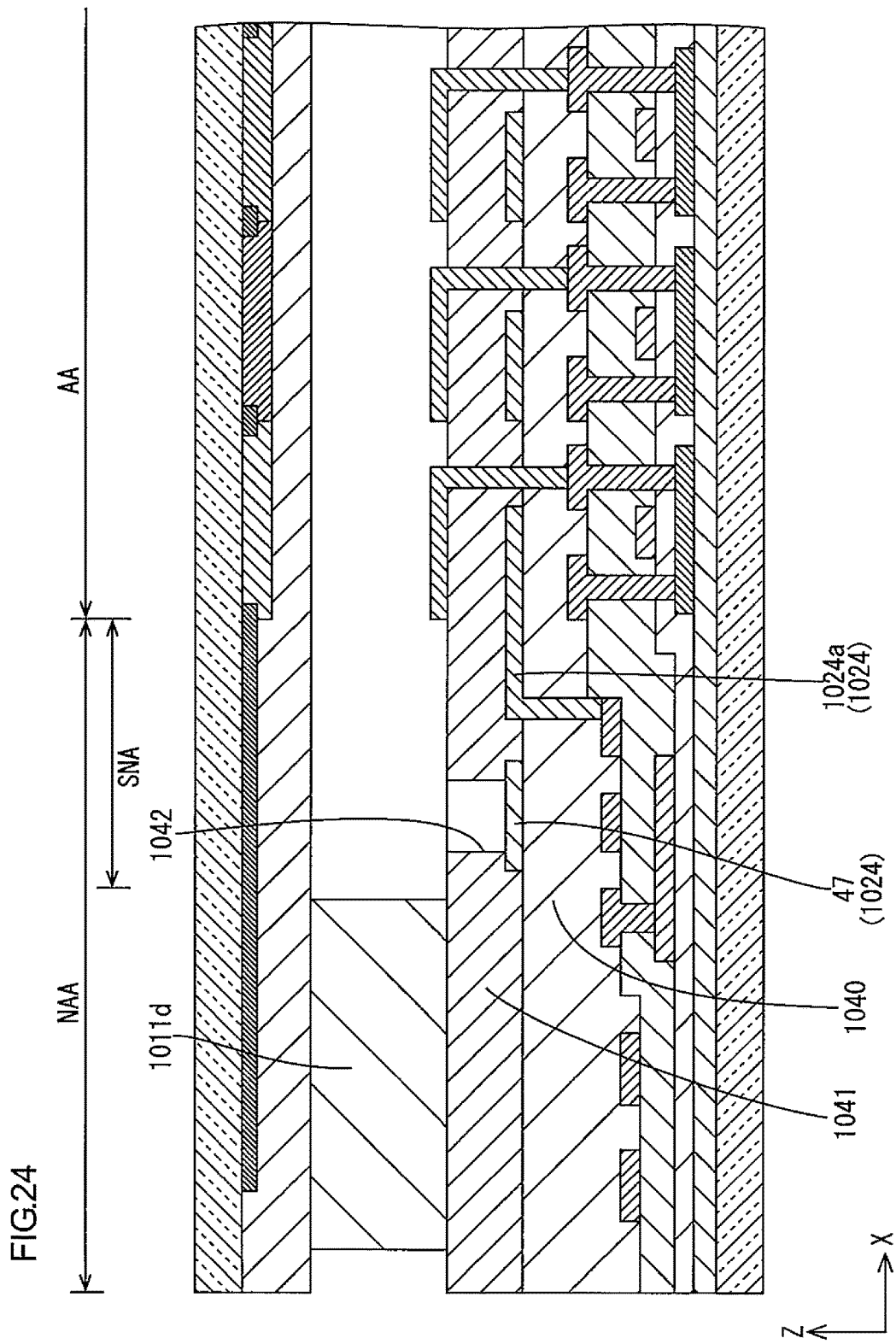
FIG. 24 is a cross-sectional view illustrating a cross-sectional configuration of an end portion of a liquid crystal panel according to an eleventh embodiment of the present invention.

As illustrated in FIG. 24, the slit 1042 according to this embodiment is arranged closer to a sealing member 1011*d* in the sealing member non-arranged portion SNA of the non-display area NAA than to the display area AA. Furthermore, the slit 1042 is arranged at a position that does not overlap an electrode film extending portion (a first electrode film extending portion) 1024*a* of a second transparent electrode film 1024 in a plan view. The second electrode film extending portion 47 formed from the second transparent electrode film 1024 at a position that overlaps the slit 1042 in a plan view. The second electrode film extending portion 47 is formed in an island pattern separated from the electrode film extending portion 1024*a*. When partially etching a first interlayer insulating film 1041 during formation of the slit 1042 in the first interlayer insulating film 1041 by the photolithography method, the second electrode film extending portion 47 of the second transparent electrode film 1024 arranged under the portion of the first interlayer insulating film 1041 in which the slit 1042 is to be formed functions as an etching stopper. With the second electrode film extending portion 47, a planarization film 1040 under the second electrode film extending portion 47 is less likely to be etched. According to the configuration, uniformity in thickness of the planarization film is properly maintained.

Twelfth Embodiment

A twelfth embodiment of the present invention will be described with reference to FIG. 25. The twelfth embodiment includes a second electrode film extending portion 1147 connected to an electrode film extending portion 1124*a* which are different from the eleventh embodiment. Configurations, functions, and effects similar to those of the first embodiment will not be described.

Figure 25:
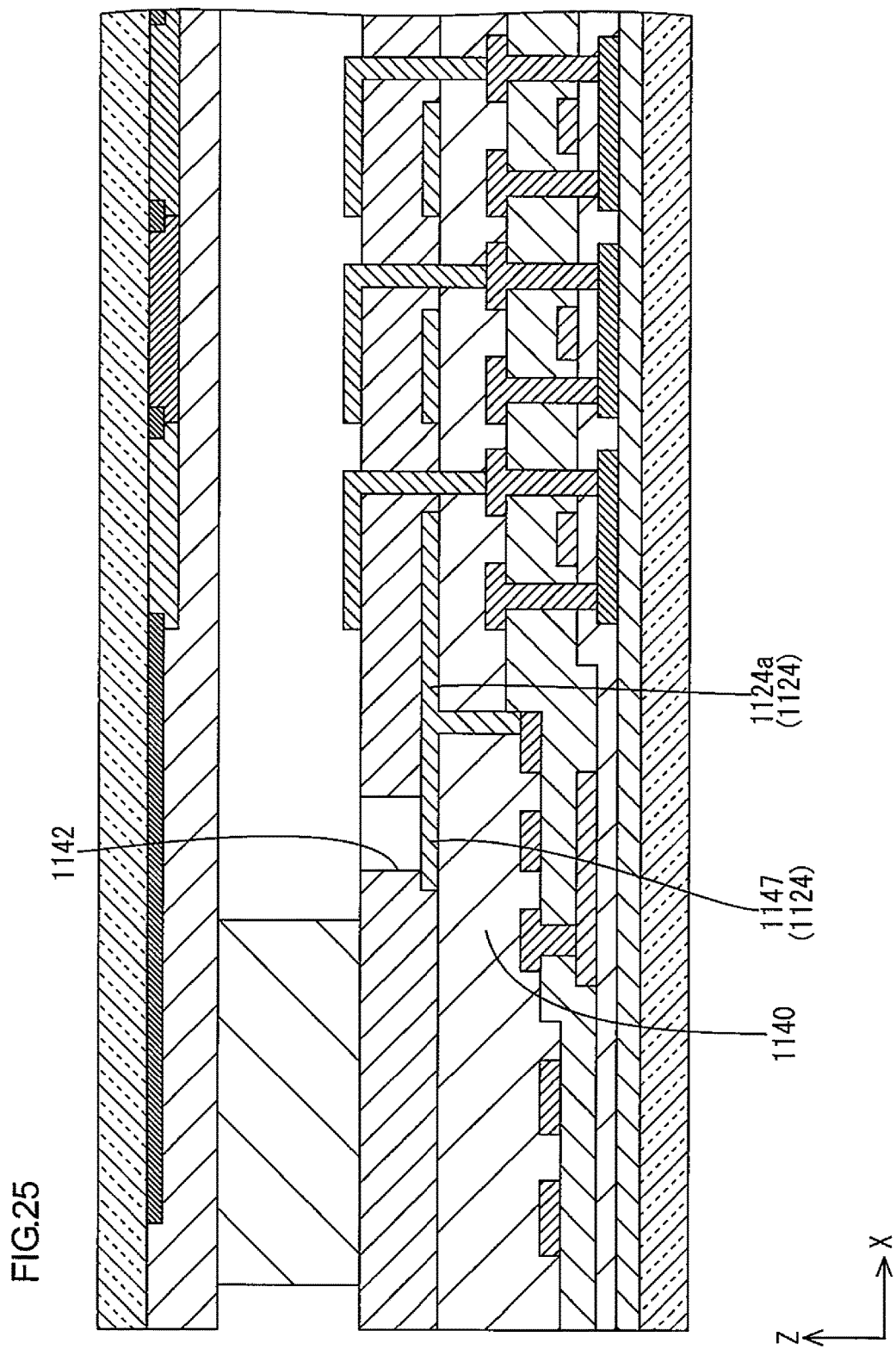
FIG. 25 is a cross-sectional view illustrating a cross-sectional configuration of an end portion of a liquid crystal panel according to a twelfth embodiment of the present invention.

As illustrated in FIG. 25, the second electrode film extending portion 1147 according to this embodiment is connected to the electrode film extending portion 1124*a*. According to the configuration, even if an arrangement of the slit 1142 in a plan view or a portion in which the slit 1142 is formed is altered, a second transparent film 1124 is easily maintained at a position that overlaps the slit 1142 in a plan view. In this configuration, the second electrode film extending portion 1147 functions as an etching stopper and thus a planarization film 1140 under the second electrode film extending portion 1147 is less likely to be etched.

Thirteenth Embodiment

A thirteenth embodiment of the present invention will be described with reference to FIG. 26. The thirteenth embodiment includes a common electrode 1222 on a CF substrate 1211*a*, which is different from the first embodiment. Configurations, functions, and effects similar to those of the first embodiment will not be described.

Figure 26:
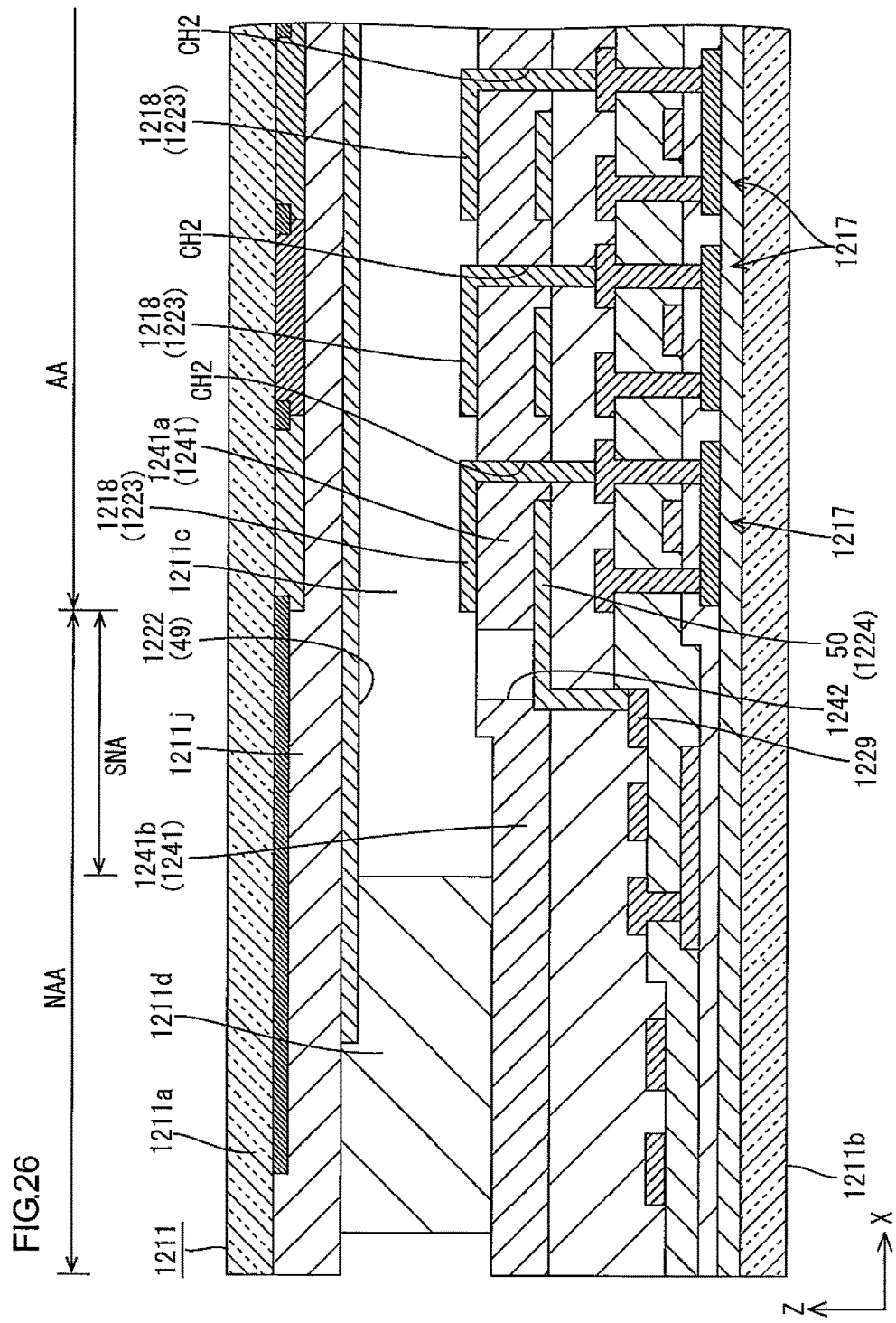
FIG. 26 is a cross-sectional view illustrating a cross-sectional configuration of an end portion of a liquid crystal panel according to a thirteenth embodiment of the present invention.

As illustrated in FIG. 26, a liquid crystal panel 1211 according to this embodiment includes the common electrode 1222 formed from a third transparent electrode film 49 and on the CF substrate 1211*a* rather than an array substrate 1211*b*. The liquid crystal panel 1211 operates in a vertical alignment (VA) mode. The third transparent electrode film 49, from which the common electrode 1222 is formed, is laid on a CF substrate-side planarization film 1211*j* in an upper layer (on a side opposite from the CF substrate 1211*a*). The third transparent electrode film 49 is formed in a solid pattern that covers about an entire surface of the CF substrate 1211*a*. The third transparent electrode film 49, from which the common electrode 1222 is formed, is made of transparent electrode material such as indium tin oxide (ITO) and zinc oxide (ZnO), which are materials used for the first transparent electrode film 1223 and the second transparent electrode film 1224. The first transparent electrode film 1223, from which pixel electrodes 1218 arranged on the array substrate 1211*b*, is opposed to the third transparent electrode film 49 on the CF substrate 1211*a*, from which the common electrode 1222 is formed, via a liquid crystal layer 1211*c*. According to the configuration, by controlling a potential difference that occurs between the transparent electrode films 1223 and 49 by driving TFTs 1217, alignment of liquid crystal molecules in the liquid crystal layer 1211*c* can be controlled. Furthermore, an auxiliary capacitor electrode 50 is formed from the second transparent electrode film 1224 that sandwiches the first interlayer insulating film 1241 together with the first transparent electrode film 1223, from which the pixel electrodes 1218 are formed. The auxiliary capacitor electrode 50 is arranged opposed to the first transparent electrode film 1223, from which the pixel electrodes 1218 are formed, via the first interlayer insulating film 1241. The auxiliary capacitor electrode 50 and the first transparent electrode film 1223, from which the pixel electrodes 1218 are formed, forms a capacitor. The auxiliary capacitor electrode 50 is connected to a common potential supplying portion 1229 and thus potentials at the pixel electrodes 1218 charged by TFTs 1217 are held for a certain period.

A portion of the first interlayer insulating film 1241 on the array substrate 1211*b* in the sealing member non-arranged area SNA of the non-display area NAA includes a slit 1242 that continuously extends along a sealing member 1211*d* for an entire periphery of the sealing member 1211*d*. The slit 1242 runs through the first interlayer insulating film 1241 in the thickness direction of the first interlayer insulating film 1241. Namely, the first interlayer insulating film 1241 is separated (or divided) into an inner peripheral portion 1241*a* and an outer peripheral portion 1241*b* by the slit 1242. The inner peripheral portion 1241*a* is located mainly in the display area AA and the outer peripheral portion 1241*b* is located entirely in the non-display area NAA. The sealing member 1211*d* is bonded to the outer peripheral portion 1241*b*. If a stress is applied to the outer peripheral portion 1241*b* of the first interlayer insulating film 1241 to which the sealing member 1211*d* is bonded due to a variation in temperature, the stress is less likely to be transmitted to the inner peripheral portion 1241*a* separated from the outer peripheral portion 1241*b* by the slit 1242. According to the configuration, the portion of the first interlayer insulating film 1241 in the display area AA is less likely to be removed and thus a problem such as displacement of the first transparent electrode film 1223 above the first interlayer insulating film 1241 is less likely to occur in the display area AA. Therefore, display deficiencies are less likely to occur. This configuration is preferable for reducing the size of the frame. The slit 1242 is formed through patterning of the first interlayer insulating film 1241 by a known photolithography method in the production process of the array substrate 1211*b*. The slit 1242 is formed simultaneously with the contact holes CH2 (in the same step).

Fourteenth Embodiment

A fourteenth embodiment of the present invention will be described with reference to FIG. 27. The fourteenth embodiment includes a slit having a depth different from the thirteenth embodiment. Configurations, functions, and effects similar to those of the thirteenth embodiment will not be described.

Figure 27:
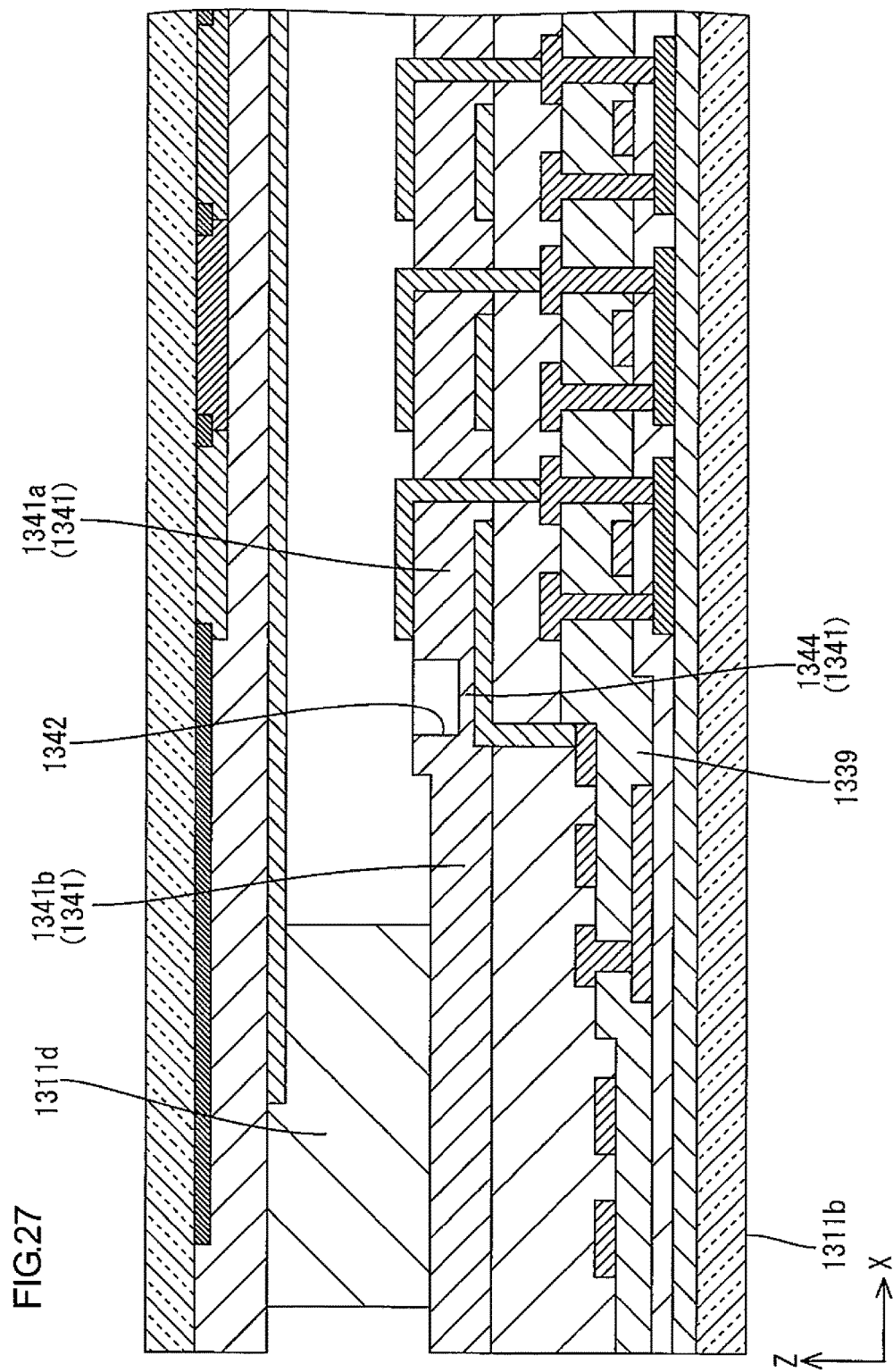
FIG. 27 is a cross-sectional view illustrating a cross-sectional configuration of an end portion of a liquid crystal panel according to a fourteenth embodiment of the present invention.

As illustrated in FIG. 27, the slit 1342 according to this embodiment has a depth such that the slit 1342 does not run through the first interlayer insulating film 1341 in the thickness direction of the first interlayer insulating film 1341. Namely, the depth of the slit 1342 is smaller than the thickness of the first interlayer insulating film 1341. A portion of the first interlayer insulating film 1341 in which the slit 1342 is formed includes a thin portion 1344 that is thinner than a thickness of a portion of the first interlayer insulating film 1341 in which the slit 1342 is not formed. The portion of the first interlayer insulating film 1341 having the thickness larger than the thin portion 1344 and in which the slit 1342 is not formed includes a portion of an outer peripheral portion 1341*b* which overlaps the sealing member 1311*d* in a plan view and the inner peripheral portion 1341*a*. The slit 1342 and the thin portion 1344 continuously extend along the sealing member 1311*d* for an entire periphery of the sealing member 1311*d*. The thin portion 1344 connects the inner peripheral portion 1341*a* of the first interlayer insulating film 1341 to the outer peripheral portion 1341*b* of the first interlayer insulating film 1341 for the entire periphery. According to the configuration, if a stress is applied to the outer peripheral portion 1341*b* of the first interlayer insulating film 1341 to which the sealing member 1311*d* is bonded due to a variation in temperature, the stress is compensated by the thin portion 1344. Therefore, the inner peripheral portion 1341*a* is less likely to be removed.

To form the slit 1324 according to this embodiment, a photo mask used for exposure of the first interlayer insulating film 1341 in an exposing step of the production process of the array substrate 1311*b* is used. The photo mask may be a halftone mask or a gray-tone mask, which is not illustrated. The halftone mask or the gray-tone mask includes a semitransmissive region having transmissivity of exposure light of about 10% to 70%. In the exposing step, a portion of the first interlayer insulating film 1341 in which the slit 1342 and the thin portion 1344 are to be formed is exposed with light transmitting through the semitransmissive region. An etching step is performed after the exposing step using such a halftone mask or a gray-tone mask. In the etching step, the slit 1342 is formed while the thin portion 1344 is maintained. Because the thin portion 1344 remains in the portion in which the slit 1342 is formed in the etching step, a second interlayer insulating film 1339 under the first interlayer insulating film 1341 is less likely to be etched. According to the configuration, thickness uniformity of the second interlayer insulating film 1339 is maintained at a high level and high flexibility in arrangement of the slit 1342 is provided.

Fifteenth Embodiment

A fifteenth embodiment of the present invention will be described with reference to FIG. 28. The fifteenth embodiment includes a different number of slits 1442 from the thirteenth embodiment. Configurations, functions, and effects similar to those of the thirteenth embodiment will not be described.

As illustrated in FIG. 28, this embodiment includes two slits 1442 formed in a first interlayer insulating film 1441 in the non-sealing member arranged area SNA of the non-display area NAA. The slits 1442 are parallel to each other. Two slits 1442 continuously extend along a sealing member 1411*d* for an entire periphery of the sealing member 1411*d*. Two slits 1422 includes an inner peripheral slit 1442A and an outer peripheral slit 1442B. The inner peripheral slit 1442A is located closer to the display area AA and the outer peripheral slit 1442B is located closer to the sealing member 1411*d*. The first interlayer insulating film 1441 includes an inner peripheral portion 1441*a*, an outer peripheral portion 1441*b*, and an intermediate portion 1446. The inner peripheral portion 1441*a* is located inner than the inner peripheral slit 1442A. The outer peripheral portion 1441*b* is located outer than the outer peripheral slit 1442B. The intermediate portion 1446 is located between the slits 1442A and 1442B. The intermediate portion 1446 has a frame shape along the slits 1442A and 1442B in a plan view.

Other Embodiments

The present invention is not limited to the embodiments, which have been described using the foregoing descriptions and the drawings. For example, embodiments described below are also included in the technical scope of the present invention.

(1) In each of the above embodiments (except for the fifth embodiment), the slit is arranged continuously or the slits are arranged at interval along the sealing member for the entire periphery of the sealing member. However, the slit or the slits may be partially arranged with respect to the periphery of the sealing member. For example, the slits may be arranged in portions of the first interlayer insulating film along straight portions of the sealing member, that is, other than corners. Alternatively, the slits may be arranged in portions of the first interlayer insulating film along corners of the sealing member, that is, other than the straight portions. Furthermore, in each of the above embodiments (except for the fifth embodiment), a width of the slit or the slits is constant for the entire periphery. However, the slit or the slits may be configured with different widths at different locations along the peripheral direction. For example, the slit having the frame shape in a plan view may have a larger width at the corners at which a larger stress may be applied in comparison to the straight portions.

(2) The intervals of the slits, the widths of the inter-slit remaining portions, the number of the slits, the shapes of the slits in a plan view in the second and the third embodiments may be altered as appropriate. Similarly, those in the ninth and the tenth embodiments may be altered.

(3) The thicknesses of the thin portions (ratios to the thicknesses of the portions of the first interlayer insulating films in which the slits are not formed) and the widths of the slits in the fourth, the sixth, and the fourteenth embodiments may be altered as appropriate. Similarly, those in the ninth and the tenth embodiments may be altered.

(4) In the fifth embodiment, the area of the array substrate in which the first interlayer insulating film is not formed (the area in which the planarization film in the lower layer is exposed) may be altered as appropriate.

(5) In the fifth embodiment, the slit may be formed in the planarization film that is under the first interlayer insulating film.

(6) In the sixth, the seventh, the eleventh, the twelfth, the thirteenth, and the fourteenth embodiments, the arrangements of the slits in a plan view may be altered as appropriate. Especially in the eleventh and the twelfth embodiments, it is preferable to alter the arrangements of the second electrode film extending portions as the arrangements of the slits in a plan view are altered.

(7) Each of the eighth and the fifteenth embodiments may include three or more slits. The widths and the intervals of the slits in the eighth and the fifteenth embodiments may be altered as appropriate.

(8) The configurations of the second, the third, the fourth, the eighth, the ninth, and the tenth embodiments may be combined with the configurations of the eleventh and the twelfth embodiments.

(9) The configurations of the second, the third, the sixth, the seventh, the ninth, and the tenth embodiments may be combined with the configurations of the thirteenth embodiment.

(10) The configurations of the fifth embodiments may be combined with the configurations of the thirteenth embodiment.

(11) In each of the above embodiments, the CG silicon thin film (the polycrystalline silicon thin film) is used for the semiconductor film. However, other materials such as an oxide semiconductor and amorphous silicon may be used for the semiconductor film.

(12) The first metal film and the second metal film in each of the above embodiments are laminated films of titanium (Ti) and copper (Cu). However, instead of titanium, molybdenum (Mo), molybdenum nitride (MoN), titanium nitride (TiN), tungsten (W), niobium (Nb), molybdenum-titanium alloy (MoTi), or molybdenum-tungsten alloy (MoW) may be used. Other than that, a single-layered metal film made of titanium, copper, or aluminum may be used.

(13) In each of the above embodiments, the liquid crystal panel includes the FFS mode as an operation mode. However, a liquid crystal panel including the IPS (in-plane switching) mode or the VA (vertical alignment) mode as an operation mode may be included in the scope of the present invention.

(14) In each of the above embodiments, the display area on the liquid crystal panel is centered with respect to the short-side direction but off-centered with respect to the long-side direction toward one of the ends. However, a liquid crystal panel including a display area that is centered with respect to the long-side direction but off-centered with to the short-side direction toward one of the ends may be included in the scope of the present invention. Furthermore, a liquid crystal panel including a display area that is off-centered with respect to the long-side direction toward one of the ends and off-centered with respect to the short-side direction toward one of the ends may be included in the scope of the present invention. Furthermore, a liquid crystal panel including a display area that is centered with respect to the long-side direction and the short-side direction may be included in the scope of the present invention.

(15) The driver is mounted directly on the array substrate by the COG method in the above embodiments. However, the driver mounted on the flexible printed circuit board connected to the array substrate through ACF may be included in the scope of the present invention.

(16) Each of the embodiments includes the liquid crystal panel having a vertically-long rectangular shape. However, the present invention can be applied to a liquid crystal panel having a horizontally-long rectangular shape or a square shape.

(17) A configuration including the liquid crystal panel in each of the above embodiments and a functional panel such as a touch panel or a parallax barrier panel (switch liquid crystal panel) attached to the liquid crystal panel may be included in the scope of the present invention. Furthermore, a configuration including a touch panel pattern directly formed on a liquid crystal panel may be included in the scope of the present invention.

(18) In each of the above embodiments, the backlight device in the liquid crystal display device is the edge-light type. However, a liquid crystal display device including a direct backlight device may be included in the scope of the present invention.

(19) Each of the above embodiments includes the transmissive type liquid crystal display device including the backlight device as an external light source. However, the present invention can be applied to a reflective liquid crystal display device configured to display images using external light. Such a display device does not require a backlight device. Furthermore, the present invention can be applied to a semi-transmissive type liquid crystal display device.

(20) Each of the above embodiments includes the TFTs as switching components of the liquid crystal display device. However, the present invention can be applied to switching components other than the TFTs (e.g., thin film diodes (TFDs)). Furthermore, the present invention can be applied to a liquid crystal display device configured to display black and white images other than the liquid crystal display device configured to display color images.

(21) The liquid crystal panel including the liquid crystal layer held between the substrates is provided as an example. However, the present invention may be applied to a display panel including functional organic molecules rather than liquid crystals held between the substrates.

(22) In each of the above embodiments, the liquid crystal panel is used for the display panel. The present invention can be applied to a display device including other type of display panel (a PDP (plasma display panel) or an organic EL panel). Such a display device may not require the backlight unit.

(23) The above embodiments include the liquid crystal panels that are classified as small sized or small to middle sized panels. Such liquid crystal panels are used in electronic devices including PDAs, mobile phones, laptop computers, digital photo frames, portable video games, and electronic ink papers. However, the present invention can be applied to liquid crystal panels that are classified as middle sized or large sized (or supersized) panels having screen sizes from 20 inches to 90 inches. Such display panels may be used in electronic devices including television devices, electronic signboards (digital signage), and electronic blackboard.

EXPLANATION OF SYMBOLS

11, 411, 1211: liquid crystal panel (display panel), 11a, 411a, 1211a: CF substrate (second substrate), 11b, 311b, 411b, 611b, 1211b, 1311b: array substrate (first substrate), 11d, 111d, 211d, 311d, 411d, 511d, 711d, 811d, 911d, 1011d, 1211d, 1311d, 1411d: sealing member, 11i: light blocking portion, 23, 423, 1223: first transparent electrode film, 24, 324, 424, 524, 624, 1024, 1124, 1224: second transparent electrode film, 24a, 324a, 524a, 624a, 1024a, 1124a: electrode film extending portion, 29: common potential supplying portion, 40, 340, 440, 540, 640, 1040, 1140: planarization film (second insulating film), 41, 141, 241, 341, 441, 541, 641, 741, 841, 841, 941, 1041, 1241, 1341, 1441: first interlayer insulating film (first insulating film), 42, 142, 242, 342, 542, 642, 742, 842, 942, 1042, 1142, 1242, 1342, 1442: slit, 44, 544, 844, 944, 1344: thin portion, 47, 1147: second electrode film extending portion (electrode film extending portion), AA: display area, CH3: contact hole, IS: internal space, NAA: non-display area

The invention claimed is:

1. A display device comprising:
a first substrate including a section in a display area and a section in a non-display area surrounding the display area;
a second substrate opposed to the first substrate with internal space between the first substrate and the second substrate;
a sealing member disposed between the first substrate and the second substrate in the non-display area to surround the internal space and seal the internal space;
a first transparent electrode film disposed at least in the display area on the first substrate;
a first insulating film to which the sealing member is bonded, the first insulating film being disposed on the first transparent electrode film on a first substrate side in an area of the first substrate across a boundary between the display area and the non-display area, the first insulating film including at least one slit arranged in the non-display area closer to the display area than to the sealing member; and
a second transparent electrode film disposed on the first insulating film on the first substrate side at least in the display area such that the first insulating film is sandwiched between the first transparent electrode film and the second transparent electrode film; wherein
the second transparent electrode film includes an electrode film extending portion that extends to the non-display area;
the at least one slit of the first insulating film is arrange to overlap the electrode film extending portion of the second transparent electrode film;
the display device further comprises:
a second insulating film disposed in an area of the first substrate across a boundary between the display area and the non-display area; and
a common potential supplying portion including a common potential and being disposed on the second insulating film on the first substrate side in the non-display area on the first substrate; and
the electrode film extending portion is connected to the common potential supplying portion via at least one contact hole formed in the second insulating film.

2. The display device according to claim 1, wherein the at least one slit of the first insulating film runs through the first insulating film in a thickness direction of the first insulating film.

3. The display device according to claim 1, wherein the first insulating film includes at least one thin portion in which the at least one slit is formed with a thickness smaller than a thickness of a portion of the first insulating film in which the at least one slit is not formed.

4. The display device according to claim 3, wherein the at least one slit of the first insulating film is arranged closer to the sealing member than to the display area.

5. The display device according to claim 1, wherein the at least one slit continuously extends along the sealing member for an entire periphery of the sealing member or the at least one slit of the first insulating film includes slits arranged at intervals along the sealing member for the entire periphery of the sealing member.

6. The display device according to claim 5, wherein the at least one slit of the first insulating film is formed in a groove shape that continuously extends for the entire periphery of the sealing member.

7. The display device according to claim 5, wherein the at least one slit of the first insulating film includes the slits arranged at intervals along the sealing member for the entire periphery of the sealing member.

8. The display device according to claim 1,
wherein the second substrate comprises a light blocking portion at least in the non-display area, and
wherein the at least one slit of the first insulating film is arranged to overlap the light blocking portion.

* * * * *